United States Patent
Rigby

(10) Patent No.: US 9,682,875 B2
(45) Date of Patent: *Jun. 20, 2017

(54) ELECTROCHEMICAL SYSTEM AND METHOD FOR THE TREATMENT OF WATER AND WASTEWATER

(71) Applicant: ELECTRO CHEMISTRY, LLC, Fairfax, VA (US)

(72) Inventor: David J. Rigby, Arlington, VA (US)

(73) Assignee: ELECTRO CHEMISTRY, LLC, Fairfax, VA (US)

(*) Notice: Subject to any disclaimer, the term of this patent is extended or adjusted under 35 U.S.C. 154(b) by 1121 days.

This patent is subject to a terminal disclaimer.

(21) Appl. No.: 13/800,903

(22) Filed: Mar. 13, 2013

(65) Prior Publication Data

US 2013/0220829 A1 Aug. 29, 2013

Related U.S. Application Data

(63) Continuation-in-part of application No. 12/492,367, filed on Jun. 26, 2009, now Pat. No. 8,460,520.
(Continued)

(51) Int. Cl.
C02F 1/46 (2006.01)
C02F 1/461 (2006.01)

(52) U.S. Cl.
CPC ........ *C02F 1/46104* (2013.01); *C02F 1/4602* (2013.01); *C02F 1/46109* (2013.01);
(Continued)

(58) Field of Classification Search
CPC ............... C02F 1/4602; C02F 1/46114; C02F 2001/46119; C02F 2001/46152;
(Continued)

(56) References Cited

U.S. PATENT DOCUMENTS 4,032,426 A 6/1977 de Nora et al.
4,872,959 A * 10/1989 Herbst ................ C02F 1/46104
204/229.6
(Continued)

FOREIGN PATENT DOCUMENTS

JP 09029259 A 2/1997
JP WO 2008026462 A1 * 3/2008 ............ C02F 1/4602
(Continued)

OTHER PUBLICATIONS

International Search Report and Written Opinion from corresponding Application No. PCT/US2013/030936 dated May 31, 2013.
(Continued)

*Primary Examiner* — Walter D Griffin
*Assistant Examiner* — Cameron Allen
(74) *Attorney, Agent, or Firm* — Carlos R. Villamar; The Villamar Firm PLLC

(57) ABSTRACT

Contaminants are removed from untreated raw water or discharge water by applying direct current through an array of spaced, alternately charged electrodes positioned within and electrically isolated from a housing to eliminate or minimize clogging of the electrodes with precipitated contaminants. The housing is surrounded with container structure that cooperates with the housing to define an inlet chamber positioned between the source of untreated water and the housing containing the spaced array of electrodes. The container structure further includes an outlet chamber defined between the housing and the container structure for accumulating and draining water treated by the spaced electrode array.

23 Claims, 13 Drawing Sheets

Related U.S. Application Data

(60) Provisional application No. 61/075,842, filed on Jun. 26, 2008, provisional application No. 61/725,861, filed on Nov. 13, 2012, provisional application No. 61/610,053, filed on Mar. 13, 2012.

(52) U.S. Cl.
CPC ............... *C02F 2001/46119* (2013.01); *C02F 2001/46152* (2013.01); *C02F 2201/008* (2013.01); *C02F 2201/4611* (2013.01); *C02F 2201/4613* (2013.01); *C02F 2201/4617* (2013.01); *C02F 2201/46105* (2013.01); *Y02W 10/37* (2015.05)

(58) Field of Classification Search
CPC .... C02F 2201/46105; C02F 2201/4611; C02F 2201/4613; C02F 2201/4617; C02F 2201/008; C02F 1/46; C02F 1/72; C02F 1/76; Y02W 10/37
See application file for complete search history.

(56) References Cited

U.S. PATENT DOCUMENTS

| | | | | |
|---|---|---|---|---|
| 5,034,110 | A | * | 7/1991 | Glore ................. C02F 1/46109 204/229.5 |
| 5,271,814 | A | * | 12/1993 | Metzler ................. B01D 17/06 204/228.4 |
| 5,364,512 | A | * | 11/1994 | Earl ..................... C02F 1/4606 204/229.6 |
| 6,309,532 | B1 | | 10/2001 | Tran et al. |
| 6,663,783 | B2 | | 12/2003 | Stephenson et al. |
| 6,793,801 | B2 | | 9/2004 | Holland |
| 6,800,206 | B2 | | 10/2004 | Robinson et al. |
| 6,860,990 | B2 | | 3/2005 | Bartl et al. |
| 6,866,757 | B2 | | 3/2005 | Gilmore |
| 6,960,301 | B2 | | 11/2005 | Bradley |
| 7,018,522 | B2 | | 3/2006 | Holland |
| 8,226,813 | B2 | * | 7/2012 | Nakano ................. C02F 1/4602 204/228.6 |
| 8,460,520 | B2 | | 6/2013 | Rigby |
| 2002/0043462 | A1 | | 4/2002 | Ivory et al. |
| 2003/0106854 | A1 | | 6/2003 | Robinson |
| 2004/0035798 | A1 | | 2/2004 | Holland |
| 2005/0029199 | A1 | | 2/2005 | Holland |
| 2009/0127194 | A1 | | 5/2009 | Joo |
| 2009/0321251 | A1 | | 12/2009 | Rigby |
| 2011/0308938 | A1 | | 12/2011 | Gilmore et al. |

FOREIGN PATENT DOCUMENTS

| | | |
|---|---|---|
| KR | 100421515 B1 | 3/2004 |
| KR | 100687095 B1 | 2/2007 |
| WO | 2008018837 A2 | 2/2008 |
| WO | 2008026462 A1 | 3/2008 |
| WO | 2011159941 A1 | 12/2011 |

OTHER PUBLICATIONS

Pouet, M. F. et al., "Electrocoagulation-flotation as pretreatment in tangential microfiltration in water treatment," Recents Progres en Genie des Procedes, 1991, vol. 5, No. 12, pp. 195-200, English Abstract.

Pouet, M. F. et al., "Urban wastewater treatment by electrocoagulation and flotation," Water Science and Technology, 1995, vol. 31, No. 3-4, pp. 275-283, Abstract.

Pouet, M. F. et al., "Urban wastewater treatment by electrocoagulation and flotation," Water Science and Technology, 1995, vol. 31, No. 3-4, pp. 275-283.

Renk, R., "Treatment of Hazardous Wastewaters by Electrocoagulation," 1989.

Rogov, V. M. et al., "Use of electrocoagulation-flotation in the technology of water treatment," Elektronnaya Obrabotka Materialov, 1978, vol. 6, pp. 80-83, Abstract.

Rogov, V. M. et al., "Use of electrocoagulation-flotation in the technology of water treatment," Elektronnaya Obrabotka Materialov, 1978, vol. 6, pp. 80-83.

Sakakibara, Y. et al., "Phosphate removal and recovery by a novel electrolytic process," Water Science and Technology, 2002, vol. 46, No. 11-12, pp. 147-152, Abstract.

Sakakibara, Y. et al., "Phosphate removal and recovery by a novel electrolytic process," Water Science and Technology, 2002, vol. 46, No. 11-12, pp. 147-152.

Sims, R. C. et al., "Electrocoagulation Removes Metals from Wastewater," Tech Trends, Sep. 1996.

Solids Recovery From Seafood Processing Stick Water Using Electrocoagulation, Feb. 1996.

Strokatova, S. F. et al., "Removal of protein-fat fractions from concentrated wastewater," Khimicheskaya Promyshlennost, 2000, vol. 11, pp. 581-583, Abstract.

Strokatova, S. F. et al., "Removal of protein-fat fractions from concentrated wastewater," Khimicheskaya Promyshlennost, 2000, vol. 11, pp. 581-583.

Tabakov, D. et al., "Influence of material of electrode system on the effect of treatment of dairy sewage by electrocoagulation and flotation," Woda I Technika Sanitarna, 1982, vol. 56, No. 9-10, pp. 197-198, Abstract.

Tabakov, D. et al., "Influence of material of electrode system on the effect of treatment of dairy sewage by electrocoagulation and flotation," Woda I Technika Sanitarna, 1982, vol. 56, No. 9-10, pp. 197-198.

Tabakov, D. et al., "Purification of dairy industry wastewater," Khranitelna Promishlenost, 1984, vol. 33, No. 7, pp. 22-23, Abstract.

Tabakov, D. et al., "Purification of dairy industry wastewater," Khranitelna Promishlenost, 1984, vol. 33, No. 7, pp. 22-23.

Tabakov, D. et al., "Treatment and utilization of wastewater from the dairy industry," Molochnaya Promyshlennost, 1984, vol. 11, pp. 43-45, Abstract.

Tabakov, D. et al., "Treatment and utilization of wastewater from the dairy industry," Molochnaya Promyshlennost, 1984, vol. 11, pp. 43-45.

Tamarkin, S. et al., "Method and apparatus for industrial wastewater treatment," Abstract of U.S. Pat. No. 5,658,450, Publication Date: Aug. 19, 1997.

Tipton, G. et al., "New Life for an Old Process," Heavy Metals Removal, Environmental Technology, Jan./Feb. 1999, pp. 28-30.

Wang, F. et al., "Treatment of wasterwater from antiseptic agent production," Shanghai Huanjing Kexue, 1990, vol. 9, No. 10, pp. 37-38, Abstract.

Xu, L. J. et al., "Recovery and utilization of useful by-products from egg processing wastewater by electrocoagulation," Poultry Science, 2002, vol. 81, No. 6, pp. 785-792, Abstract.

Xu, L. J. et al., "Recovery and utilization of useful by-products from egg processing wastewater by electrocoagulation," Poultry Science, 2002, vol. 81, No. 6, pp. 785-792.

SciFinder Scholar, Oct. 26, 2004.

Chiou, J. et al., "Study on removing organic matter from swine wastewater by the electrcoagulation method," Journal of the Environmental Protection Society of the Republic of China, Jun. 1993, vol. 16, No. 1.

Alvarado, J. H. et al., "Evaluation of Electrocoagulation Technology for the Removal of Chromium, Silver, Zinc, and Nickel," George Washington University—Civil and Environmental Engineering Department, 2003.

Barkley, N. P. et al., "Emerging Technology Summary—Electro-Pure Alternating Current Electrocoagulation," United States Environmental Protection Agency, Sep. 1993.

Cocke, D. L. et al., "Electrocoagulation an evolving electrochemical technology for wastewater treatment," Preprints of Extended Abstracts presented at the ACS National Meeting, American Chemical Society, Division of Environmental Chemistry, 2002, vol. 42, No. 2, pp. 501-507, Abstract.

(56) References Cited

OTHER PUBLICATIONS

Cora-Hernandez et al., "Electrocoagulation/flotation (ECF) technology used in the treatment of wastewater containing variable concentrations of heavy metals and organic pollutants," Diss. Abstr. Int., 2003, vol. 63, No. 12.
Current Water Technology Industrial Wastewater Treatment Equipment, Feb. 25, 2002.
General Environmental Corporation, Cure Electrocoagulation Technology, Innovative Technology Evaluation Report, Sep. 1998.
Gilmore, F. W. et al., "Electrocoagulation—A technical analysis," Oct. 2001.
Louisiana Sugarcane Research, http://www.agctr.lsu.edu/Subjects/sugarcane/clarification.asp, Feb. 25, 2002.
Kaselco by Kaspar, Wastewater Treatment Utilizing Electrocoagulation, http://www.kaselco.com/, Oct. 22, 2003.
Matsumoto, M. R. et al., "Physicochemical Processes," Water Environment Research, 1996, vol. 68, No. 4, pp. 431-460.
New Electrocoagulation process treats emulsified oily wastewater at Vancouver Shipyards, http://www.esemag.com/0103/electro.html, Jan. 2003.
Electrocoagulation: An Innovative Waste-Water Treatment Technology, http://www.parsenviro.com/electro.html, Oct. 22, 2003.
Phutdhawong, W. et al., "Electrocoagulation and subsequent recovery of phenolic compounds," Analytical Sciences, Oct. 2000, vol. 16, pp. 1083-1084.
Powell Water Systems, Inc., "Electrocoagulation and Wastewater Treatment Systems," http://www.powellwater.com, Oct. 22, 2003.
RECRA Environmental, Inc., http://www.clu-in.org/products/site/complete/rcraenvi.htm, Feb. 25, 2002.
Smith, J., Clean Water, Inc., 1993.
Specializing in the Treatment of Industrial Wastewater Using Advanced Non-Chemical Wastewater Treatment Technology, Advanced Scientific Water Systems, Feb. 25, 2002.
The Stormwater Management Electrocoagulation System, 2002.
Vorontsova, L. V. et al., "Removal of fine mineral particles from wastewaters," 2002.
Ionic Electrocoagulation for cleanup of Heavy Metals, Hexavalent Chrome, etc., http://www.wee-engineer.com/ionic.htm, Feb. 25, 2002.
WMRC Factsheet, Electrocoagulation Technology Ace Plating, Part II, Dec. 2001.
International Preliminary Report on Patentability for PCT/US2009/048812 dated Jan. 5, 2011.
English Translation Abstract for JP09029259A dated Jul. 24, 1995.
Abu-Orf, M. et al., "Electric Avenue—Pretreating solids with electric arc treatment enhances dewaterability," W, E, and T, Jul. 2000, pp. 64-68.
Adhoum, N. et al., "Decolourization and removal of phenolic compounds from olive mill wastewater by electrocoagulation," Chemical Engineering and Processing, 2004, vol. 43, No. 10, pp. 1281-1287, Abstract.
Andreev, S. et al., "Upgrading of wastewater treatment facilitates of the Mokshansk dairy plant," Vodosnabzhenie I Sanitarnaya Tekhnika, 1995, vol. 6, pp. 26-27, Abstract.
Andreev, S. et al., "Upgrading of wastewater treatment facilitates of the Mokshansk dairy plant," Vodosnabzhenie I Sanitarnaya Tekhnika, 1995, vol. 6, pp. 26-27.
Bayramoglu, M. et al., "Operating cost analysis of electrocoagulation of textile dye wastewater," Separation and Purification Technology, 2004, vol. 37, No. 2, pp. 117-125, Abstract.
Bayramoglu, M. et al., "Operating cost analysis of electrocoagulation of textile dye wastewater," Separation and Purification Technology, 2004, vol. 37, No. 2, pp. 117-125.
Beck, E. C. et al., "Electroagulation clarifies food wastewater," Food Technology, 1974, vol. 28, No. 2, pp. 18-19, Abstract.
Beck, E. C. et al., "Electroagulation clarifies food wastewater," Food Technology, 1974, vol. 28, No. 2, pp. 18-19.
Bejankiwar, R. S. et al., "Electrochemical treatment of cigarette industry wastewater: feasibility study," Water Research, 2002, vol. 36, No. 17, pp. 4386-4390, Abstract.

Bejankiwar, R. S. et al., "Electrochemical treatment of cigarette industry wastewater: feasibility study," Water Research, 2002, vol. 36, pp. 4386-4390.
Bektas, N. et al., "Removal of phosphate from aqueous solutions by electro-coagulation," Journal of Hazardous Materials, 2004, vol. 106, No. 2-3, pp. 101-105, Abstract.
Bektas, N. et al., "Removal of phosphate from aqueous solutions by electro-coagulation," Journal of Hazardous Materials, 2004, vol. 106, No. 2-3, pp. 101-105.
Belov, L. P. et al., "Electroagulation treatment of wastewater of hydrolysis-yeast production," Khim. Pererab. Drev., 1983, pp. 56-60, Abstract.
Belov, L. P. et al., "Possible Improvement of an electrocoagulator," Khim. Pererab. Drev. Syr'ya, 1984, pp. 45-49, Abstract.
Belov, L. P. et al., "Possible Improvement of an electrocoagulator," Khim. Pererab. Drev. Syr'ya, 1984, pp. 45-49.
Bilyk, A., "Electrocoagulation of biologically treated wastewater," Mater. Miedzynar. Konf. Nauk, 1978, vol. 1, pp. 235-255, Abstract.
Bilyk, A., "Electrocoagulation of biologically treated wastewater," Mater. Miedzynar. Konf. Nauk, 1978, vol. 1, pp. 235-255.
Biwyk, A. et al., "Electrocoagulation of biologically treated sewage," Proceedings of the Industrial Waste Conference, 1981, vol. 35, pp. 541-549, Abstract.
Biwyk, A. et al., "Electrocoagulation of biologically treated sewage," Proceedings of the Industrial Waste Conference, 1981, vol. 35, pp. 541-549.
Buso, A. et al., "Electrochemical removal of tannins from aqueous solutions," Industrial and Engineering Chemistry Research, 2000, vol. 39, No. 2, pp. 494-499, Abstract.
Buso, A. et al., "Electrochemical removal of tannins from aqueous solutions," Industrial and Engineering Chemistry Research, 2000, vol. 39, No. 2, pp. 494-499.
Bustamante, H. A. et al., "Innovative techniques for the handling and reuse of water treatment plant sludges," Water Supply, 1995, vol. 13, pp. 233-238, Abstract.
Bustamante, H. A. et al., "Innovative techniques for the handling and reuse of water treatment plant sludges," Water Supply, 1995, vol. 13, pp. 233-238.
Carstadt, U. et al., "Conditioning of sewage sludge by electrocoagulation," ATV-Schriftenreihe, 1999, Abstract.
Chen, G. et al., "Electrocoagulation and electroflotation of restaurant wastewater," Journal of Environmental Engineering, 2000, vol. 126, No. 9, pp. 858-863, Abstract.
Chen, G. et al., "Electrocoagulation and electroflotation of restaurant wastewater," Journal of Environmental Engineering, 2000, vol. 126, No. 9, pp. 858-863.
Chen, X. et al., "Analysis of electrocoagulation energy consumption and measures of enegery saving," Shuichuli Jishu, 1997, vol. 23, No. 3, pp. 165-168, Abstract.
Chen, X. et al., "Investigation on the electrolysis voltage of electrocoagulation," Chemical Engineering Science, 2002, vol. 57, No. 13, pp. 2449-2455, Abstract.
Chowwanapoonpohn, S. et al., "Electrocoagulation of certain organic substance," ACGC Chemical Research Communications, 2002, vol. 14, pp. 70-75, Abstract.
Chowwanapoonpohn, S. et al., "Electrocoagulation of certain organic substance," ACGC Chemical Research Communications, 2002, vol. 14, pp. 70-75.
Ciorba, G. A. et al., "Correlation between organic component and electrode material: consequences on removal of surfactants from wastewater," Electrochimica Acta, 2000, vol. 46, pp. 297-303.
Daily, J. et al., "Alternatives matrix," Technical Memorandum No. 2, Jan. 5, 2007.
Daily, J. et al., "Wastewater characterization, treatment objectives and existing system assets," Technical Memorandum No. 1, Dec. 21, 2006.
Dalrymple, C. W. et al., "Electrocoagulation of Industrial wastewaters," Proceedings Annual Meeting—Air & Watse Management Association, 1997, Abstract.
Dalrymple, C. W. et al., "Electrocoagulation of Industrial wastewaters," Proceedings Annual Meeting—Air & Watse Management Association, 1997.

(56) References Cited

OTHER PUBLICATIONS

Donini, J. C. et al., "Electrocoagulation," Emerging Sep. Technol. Met. Fuels, Proc. Symp., 1993, pp. 409-424, Abstract.
Donini, J. C. et al., "Electrocoagulation," Emerging Sep. Technol. Met. Fuels, Proc. Symp., 1993, pp. 409-424.
Donini, J. C. et al., "The operating cost of electrocoagulation," Canadian Journal of Chemical Engineering, 1994, vol. 72, No. 6, pp. 1007-1012, Abstract.
Donini, J. C. et al., "The operating cost of electrocoagulation," Canadian Journal of Chemical Engineering, 1994, vol. 72, No. 6, pp. 1007-1012.
Farrell, J. M., "Electrochemical methods for wastewater and potable water treatment," 2002, vol. 42, No. 2, pp. 501-507, Abstract.
Feng, C. et al., "Performance of Two New Electrochemical Treatment Systems for Wastewaters," Journal of Environmental Science and Health, 2004, Abstract.
Feng, C. et al., "Performance of Two New Electrochemical Treatment Systems for Wastewaters," Journal of Environmental Science and Health, 2004.
Feng, S. et al., "Electro-coagulation process for phosphorus removal from secondary effluent," Zhongguo Jishul Paishui, 2003, vol. 19, No. 1, pp. 52-54, Abstract.
Ganin, B. A. et al., "Study of methods of treating run-off water from thickeners of fermented sludge," Trudy-Mosvodkokanalniiproekt, 1977, vol. 1, pp. 63-73, Abstract.
Gega, J. et al., "Radical clarifiers and thickeners with lamella modules," Environmental Science Research, 1991, vol. 42, pp. 465-473, Abstract.
Gega, J. et al., "Radical clarifiers and thickeners with lamella modules," Environmental Science Research, 1991, vol. 42, pp. 465-473.
Grechko, A. V. et al., "Removal of pesticides from greenhouse drainage wastewater," Khimiya I Tekhnologiya Vody, 1982, vol. 4, No. 1, pp. 56-58, Abstract.
Grechko, A. V. et al., "Removal of pesticides from greenhouse drainage wastewater," Khimiya I Tekhnologiya Vody, 1982, vol. 4, No. 1, pp. 56-58.
Greene, H. W., "Waste Water Treatment by Electric Arc," Scientific Utilization Inc., Aug. 10, 1994.
Groeterud, O. et al., "Phosphorus removal from water by means of electrolysis," Water Research, 1986, vol. 20, No. 5, pp. 667-669, Abstract.
Groeterud, O. et al., "Phosphorus removal from water by means of electrolysis," Water Research, 1986, vol. 20, No. 5, pp. 667-669.
Haba, A. et al., "Research on a possibility of using electroflotation process for waste treatment from fish proceedings," Environment Protection Engineering, 1994, vol. 18, No. 3-4, pp. 19-27, Abstract.
Haba, A. et al., "Research on a possibility of using electroflotation process for waste treatment from fish proceedings," Environment Protection Engineering, 1994, vol. 18, No. 3-4, pp. 19-27.
Ibanez, J. G. et al., "Laboratory Experiments on electrochemical remediation of the environment: electrocoagulation of oily wastewater," Journal of Chemical Education, 1995, vol. 72, No. 11, pp. 1050-1052, Abstract.
Ibanez, J. G. et al., "Laboratory Experiments on electrochemical remediation of the environment: electrocoagulation of oily wastewater," Journal of Chemical Education, 1995, vol. 72, No. 11, pp. 1050-1052.
Inan, H. et al., "Olive oil mill wastewater treatment by means of electro-coagulation," Separation and Purification Technology, 2004, vol. 36, No. 1, pp. 23-31, Abstract.
Inan, H. et al., "Olive oil mill wastewater treatment by means of electro-coagulation," Separation and Purification Technology, 2004, vol. 36, No. 1, pp. 23-31.
Ionenko, V. I. et al., "Mathematical modeling of electrocoagulation," Gidrotekh. Sooruzhenii Inzh. Gidrogeol. 1973, vol. 40, No. 1, pp. 103-107, Abstract.
Jaouani, A. et al., "Proposal of a treatment flowchart for the olive oil mill wastewaters," Universiteit Gent, 2000, vol. 65, No. 3a, pp. 111-113, Abstract.
Jaouani, A. et al., "Proposal of a treatment flowchart for the olive oil mill wastewaters," Universiteit Gent, 2000, vol. 65, No. 3a, pp. 111-113.
Joffe, L. et al., "Electrocoagulation," Industrial Wastewater, 2000, Abstract.
Joffe, L. et al., "Electrocoagulation," Industrial Wastewater, 2000.
Karpuzcu, M. et al., "Purification of agro-industrial wastewater from the grease-protein mixture by means of electroflotocoagulation," Water Science and Technology, 2002, vol. 45, No. 12, pp. 233-240, Abstract.
Karpuzcu, M. et al., "Purification of agro-industrial wastewater from the grease-protein mixture by means of electroflotocoagulation," Water Science and Technology, 2002, vol. 45, No. 12, pp. 233-240.
Khristoskova, S. et al., "Possibility of purification and decoloring wastewaters from the yeast industry by electrocoagulation," Nauchni Trudove—Plovdivski Universitet Paisil Khilendarski, 1984, Abstract.
Khristova, S. et al., "Study of the possibility of treating and decolorizing yeast production wastewater by electrocoagulation," Tseluloza I Khartiya, 1984, vol. 15, No. 6, pp. 24-25, Abstract.
Khristova, S. et al., "Study of the possibility of treating and decolorizing yeast production wastewater by electrocoagulation," Tseluloza I Khartiya, 1984, vol. 15, No. 6, pp. 24-25.
Kozyura, A. S. et al., "Electrocoagulation of synthetic latex in waste waters," Gidrotekhnicheskie Sooruzheniya, 1974, vol. 17, pp. 81-84, Abstract.
Kozyura, A. S. et al., "Electrocoagulation of synthetic latex in waste waters," Gidrotekhnicheskie Sooruzheniya, 1974, vol. 17, pp. 81-84.
Lai, J. et al., "Study on removing organic matter from swine wastewater by the electrocoagulation method," Huanjing Baohu (Taipei, Taiwan), 1993, vol. 16, No. 1, pp. 18-34, Abstract.
Matveenko, A. P. et al., "Technology of treating wastewater to remove organomineral matter suspended in concentrated aqueous solutions from wastewaters," Zhurnal Prikladnoi khimii, 1985, vol. 58, No. 1, pp. 122-126, Abstract.
Matveenko, A. P. et al., "Technology of treating wastewater to remove organomineral matter suspended in concentrated aqueous solutions from wastewaters," Zhurnal Prikladnoi khimii, 1985, vol. 58, No. 1, pp. 122-126.
Mejbaum, Z. et al., "Removal of emulsified oils from effluents by electrocoagulation," Przemysl Chemiczny, 1978, vol. 57, No. 8, pp. 407-410, Abstract.
Mejbaum, Z. et al., "Removal of emulsified oils from effluents by electrocoagulation," Przemysl Chemiczny, 1978, vol. 57, No. 8, pp. 407-410.
Merkvirt, R. K. et al., "Results of studies on electric treatment of petroleum-containing wastewaters from tankers," 1982, Abstract.
Metzler, D. M. A. et al., "Thin film electrocoagulation for removal for containments from liquid media," Abstract of U.S. Pat. No. 5,271,814, Publication Date: Dec. 21, 1993.
Mills, D. et al., "A new process for electrocoagulation," American Water Works Association, 2000, vol. 92, No. 6, pp. 34-43, Abstract.
Mills, D. et al., "A new process for electrocoagulation," American Water Works Association, 2000, vol. 92, No. 6, pp. 34-43.
Min, K. et al., "Removal of ammonium from tannery wastewater by electrochemical treatment," Journal of Environmental Science and Health, 2004, Abstract.
Min, K. et al., "Removal of ammonium from tannery wastewater by electrochemical treatment," Journal of Environmental Science and Health, 2004.
Mollah, M. Y. A. et al., "Electrocoagulation (EC)—Science and applications," Journal of Hazardous Materials, 2001, vol. 84, No. 1, pp. 29-41, Abstract.
Mollah, M. Y. A. et al., "Electrocoagulation (EC)—Science and applications," Journal of Hazardous Materials, 2001, vol. 84, No. 1, pp. 29-41.
Nanescu, V. et al., "Water cleaning and treating by electrocoagulation," Industria Usoara, 1984, vol. 31, No. 8, pp. 348-351, Abstract.
Parekh, B. K. et al., "The alternating current electro-coagulation process," Advances in Filtration and Separation Technology, 1990, pp. 548-554, Abstract.

(56) References Cited

OTHER PUBLICATIONS

Parekh, B. K. et al., "The alternating current electro-coagulation process," Advances in Filtration and Separation Technology, 1990, pp. 548-554.

Paul, A. B. et al., "Electrolytic treatment of turbid water in package plant," Reaching the Unreached: Challenges for the 21st Century, 1996, pp. 286-288.

Peters, R. W. et al., "Wastewater treatment—physical and chemical methods," Journal—Water Pollution Control Federation, 1986, vol. 58, No. 6, pp. 481-490, Abstract.

Peters, R. W. et al., "Wastewater treatment—physical and chemical methods," Journal—Water Pollution Control Federation, 1986, vol. 58, No. 6, pp. 481-490.

Piatrik, M. et al., "Pretreatment of wastewater from production of starch by electroflotation," Vodni Hospodarstvi, 1991, vol. 41, No. 9, pp. 328-330, Abstract.

Pikaev, A. K. et al., "Combined electron-beam and coagulation purificiation of molasses distillery slops. Features of the method, technical, and economic evaluation of large-scale facility," Radiation Physics and Chemistry, 2001, vol. 61, No. 1, pp. 81-87, Abstract.

Pikaev, A. K. et al., "Combined electron-beam and coagulation purification of molasses distillery slops. Features of the method, technical and economic evaluation of large-scale facility," Radiation Physics and Chemistry, 2001, vol. 61, pp. 81-87.

Pillay, G. et al., "Electrochemical treatment and minimization of defense-related wastes," Proceedings—Electrochemical Society, 2000, Abstract.

Pillay, G. et al., "Electrochemical treatment and minimization of defense-related wastes," Proceedings—Electrochemical Society, 2000.

Pogrebnaya, V. L. et al., "Purification of wastewater of food factories containing proteins," Pishchevaya Teknologiya, 1994, Abstract.

Pogrebnaya, V. L. et al., "Purification of wastewater of food factories containing proteins," Pishchevaya Teknologiya, 1994.

Polunina, E. et al., "Electrocoagulation treatment of sewage in antibiotic production," Antibiotiki I Khimioterapiya, 1995, vol. 40, No. 11-12, pp. 10-15, Abstract.

Polunina, E. et al., "Electrocoagulation treatment of sewage in antibiotic production," Antibiotiki I Khimioterapiya, 1995, vol. 40, No. 11-12, pp. 10-15.

Pouet, M. F. et al., "Couplage Electrocoagulation-Flottation: Application comme Pretraitement a la microfiltration tangentielle en traitement des eaux," Recents Progres en Genie des Procedes, 1991, vol. 5, No. 12, pp. 195-200.

\* cited by examiner

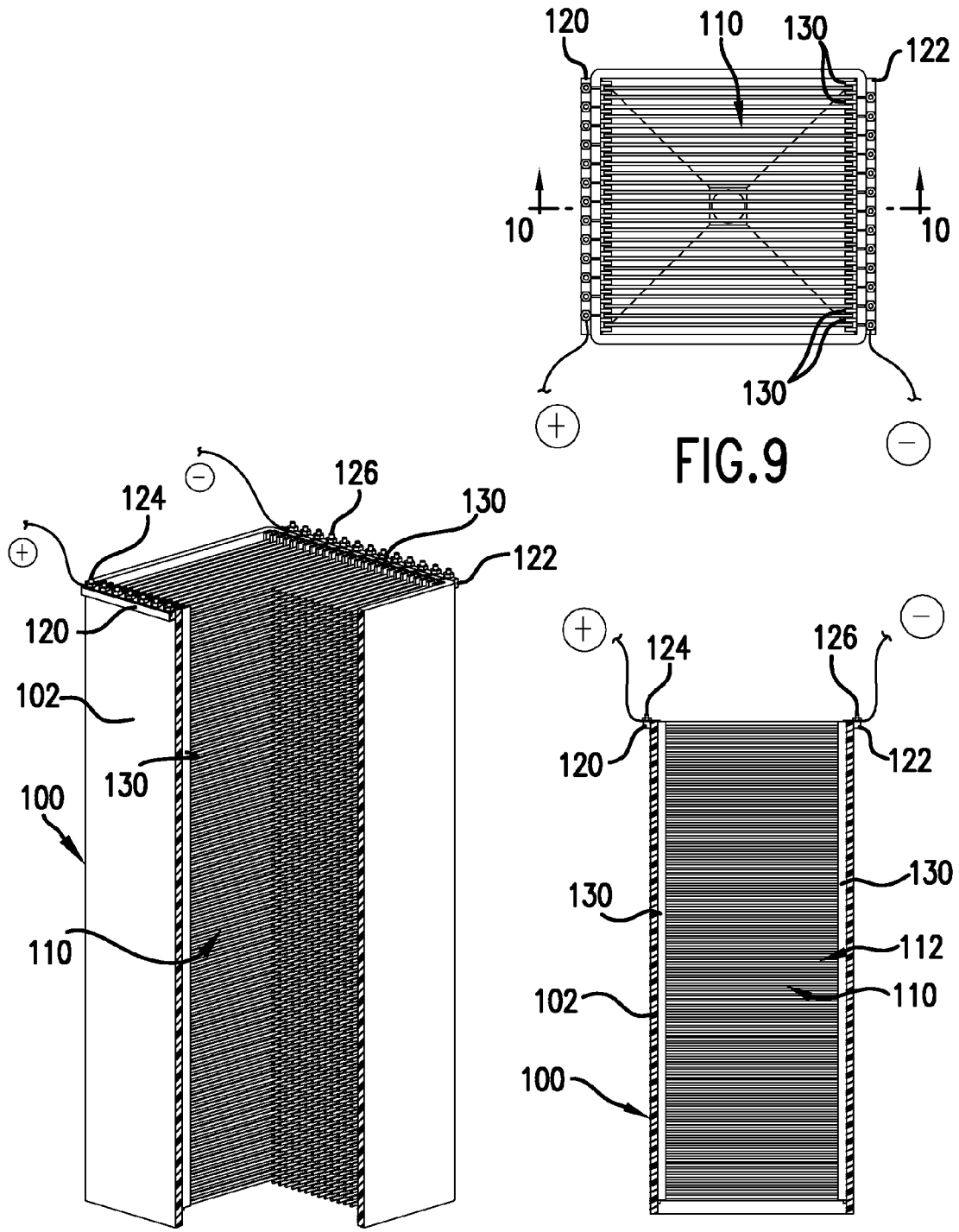

ELECTROCHEMICAL SYSTEM AND METHOD FOR THE TREATMENT OF WATER AND WASTEWATER

RELATED APPLICATIONS

This application is a continuation-in-part of U.S. patent application Ser. No. 12/492,367, filed on Jun. 26, 2009, and claims the benefit of priority to Provisional Application No. 61/725,861, filed on Nov. 13, 2012, and Provisional Application No. 61/610,053, filed on Mar. 13, 2012. Each of above applications is incorporated herein by reference in its entirety.

FIELD OF THE INVENTION

This invention relates to water and wastewater treatment, and more particularly, but not limited to, treatment of surface water, groundwater, domestic sewage, industrial feed water, industrial process wastewater, hazardous and toxic wastes, liquid waste byproducts, the byproducts including, but not limited to, waste biosolids and membrane reject water, as well as but not limited to bilge water and waste water from ships.

BACKGROUND OF THE INVENTION

A variety of methods have been used to treat and remove contaminants from water and wastewater. The procedures and techniques actually used by municipal utilities for the treatment of drinking water and sanitary sewage have remained largely unchanged for at least 40 years.

Municipal drinking water treatment typically involves pumping surface (river or reservoir) water to a high energy mixing tank where alum and/or lime is added. The water then flows into a low energy mixing tank where chemically bound sediment floc is formed. From the flocculation tank the water flows into a gravity clarification tank, then on to a granular media filter and finally the water is disinfected with chlorine prior to distribution.

Municipal treatment of groundwater (wells) tends typically to involve the addition of a strong oxidant such as chlorine or potassium permanganate to oxidize a variety of dissolved pollutants such as iron, manganese, trace organics, heavy metals, radionuclides and bacteria. The chemically treated groundwater is then filtered and disinfected prior to distribution.

Municipal treatment of sanitary sewage typically includes screening to remove large solids, treatment of dissolved organics through a process generically referred to as activated sludge, gravity settling (clarification), then filtration and finally disinfection. In the past chlorine was commonly used for the disinfection of both water and wastewater, but as a result of recognition by the US EPA that byproducts of chlorine may be potentially carcinogenic, new regulations have been passed limiting the widespread use of chlorine and requiring the reduction or elimination of disinfection byproducts. Consequently, ultraviolet light has emerged as the disinfectant of choice.

Because procedures and techniques for treating water and wastewater have advanced little over the past 40 years, there is a glaring need for new methods and systems for treating water and wastewater that is efficient, effective and reliable and which produces minimal waste byproducts (sludge).

Prior art attempts to improve systems and electrochemical treatment methods for wastewater treatment have not been satisfactory. Those reported in the literature have utilized either parallel electrified plates made of iron or aluminum as electrodes, or a single rod within a cylinder made of iron or aluminum as electrodes. In the case of the parallel plates, the electrical charge density on the plates is insufficient to properly treat the water or wastewater unless the plate spacing is minimal (less than 1/4"; 0.365 cm). This typically results in rapid plugging or clogging of the treatment unit. In the case of a single rod within a cylinder, often the spacing between the central rod and the perimeter wall is so great as to be ineffective in creating a sufficiently strong charge density to completely treat water or wastewater.

Classically, the efforts of the past have focused on the use of either parallel plates or center rods inside a tube as the positively and negatively charged electrodes. Due to the inefficiency of the plate designs, it was considered necessary to minimize plate spacings which quickly resulted in fouling of treatment units. The center rod and tube designs experienced similar problems and attempted to use high voltage potentials to overcome ineffectiveness. In one approach, using electrochemical cells in series with varying electrode materials was tried to achieve the desired treatment effectiveness. In every case, treatment technologies proved to be physically self-limiting and scaling factors (enlarging the units) became problematic. Furthermore, these approaches were typically characterized by high energy consumption as attempts to reach intended treatment levels were explored. This fact became a significant barrier to practical commercialization. Previous attempts to develop effective electrochemical technologies for treatment of water and wastewater resulted in processes that were very expensive to operate and not effective.

SUMMARY OF THE INVENTION

A system is provided for removing contaminants from raw water or waste water. The system includes at least one electrochemical treatment module comprising a housing having an inlet for untreated water and an outlet for treated water that has been treated within the housing. An array of electrodes is positioned within the housing to provide electrically conductive grills. The electrodes have spaces therebetween of a selected distance, the spaces being greater than about 0.25 inch (0.635 cm). A source is provided for applying direct current the electrodes to charge one portion of the array positively and another portion of the array negatively so as to create an electrical gradient between portions of the array, the direct current being sufficient to ionize contaminants, but not large enough to clog the spaces between electrodes with precipitated contaminants. A container structure disposed adjacent to the housing. The container structure has an inlet chamber and an outlet chamber, wherein the inlet chamber accumulates untreated water received and delivers the untreated water to the inlet of the housing. The housing has an outlet that is connected to the outlet chamber of the container and the outlet chamber has an outlet line that drains treated water from the outlet chamber.

In an aspect of the invention, the container structure has an inner wall. The housing is polygonal with at least two pairs of vertically extending corners, each of which corners engaging the inner wall to provide first and second housing walls that cooperate with the inner wall of the container structure to define the inlet and outlet chambers.

In an aspect of the invention, the first housing wall defines an inlet opening at the bottom thereof and the second wall defines an outlet opening at the top thereof with the outlet opening being larger in area than the inlet opening.

In an aspect of the invention, the inlet opening extends horizontally with respect to a lower edge of the first wall of the housing and the outlet extends horizontally with respect to the second wall of the housing.

In an aspect of the invention, the inlet opening is an undercut of the first wall and the outlet opening is an overcut of the second wall.

In an aspect of the invention, the housing containing the array of electrodes is square and the container defines a cylindrical inner wall.

In an aspect of the invention, two side chambers are formed in addition to the inlet and outlet chambers.

In an aspect of the invention, the two side chambers are filled with solid foam.

In a further aspect of the invention, a plurality of cells each defined by a module within a container are arranged in parallel to treat contaminated water flowing to each of the cells through a feed line from the source of contaminated water.

In still a further aspect of the invention, the housing and the container structure are both made of dielectric material. To prevent substantial leakage of electric charge from the electrically conductive grills to the housing and container structure, an air gap is disposed between the top surface of the untreated water accumulated in the inlet chamber and the inlet line connected to the inlet line. An additional air gap occurs between the outlet of the housing and treated water accumulated in the outlet chamber.

The present invention described herein relates to systems for efficiently and effectively removing a broad range of contaminants from water and wastewater including, but not limited to, surface water, groundwater, industrial process water, sanitary sewage, industrial wastewater, water containing hazardous or toxic materials, stormwater runoff containing a variety of organic and inorganic pollutants and contaminants and fluid streams containing byproducts of conventional water treatment and waste activated sludge treatment from domestic wastewater treatment plants.

The systems described herein achieve treatment and removal of dissolved and particulate, organic and inorganic contaminants by means of a variety of treatment and removal processes. The processes include, but are not limited to, electro-coagulation, electro-flocculation, electro-flotation, electrochemical oxidation, electrochemical reduction, electrolysis of water and other molecules, dissociation of water and other molecules and both organic and inorganic ions, production of free radicals in the aqueous solution, electrical charge neutralization, decrease of Zeta potential, electroplating, and electrical voltage potential resulting in the destruction of bacteria and viruses.

The systems described herein effectively treat, oxidize, remove or destroy a broad range of contaminants including but not limited to the following:

heavy metals such as chromium, lead, mercury, cadmium, copper and zinc, arsenic from groundwater, petroleum oils in the form of refinery wastes, well drilling spoils, runoff from transportation activities including truck and vehicle washing and airport fueling operations, contaminants generated by marine vessels including military ships, merchant marine vessels, cruise ships and pleasure crafts, including the treatment of bilge water, fats, oils and grease (FOGs) from a variety of sources including food production facilities such as slaughtering plants, dairies, mayonnaise, vegetable oil and salad dressing plants, bakeries, fish processing plants, rendering plants, and further processing and finished product plants, aquatic nuisance nutrients such as nitrogen in the form of nitrates and phosphates, organic and inorganic acid wastes, organic wastes high in biochemical oxygen demand (BOD) and high chemical oxygen demand (COD), organic wastes with long chain and complex organic compounds, pharmaceutical wastes, pharmaceuticals in urine and feces, wastes contaminated with phenolic compounds, wastes with high concentrations of organic and inorganic suspended or colloidal solids, wastes with high concentrations of toxic organics including cyanide, colloidal solids, sediment and algae from surface water, iron, manganese and nitrate from groundwater and organics, solids, nitrogen, phosphorous and bacteria from domestic sanitary sewage, waste water from fracking practiced in the production of natural gas and petroleum, gray water from laundry operations both domestic and industrial, nuclear waste and water contaminated with transuranic material and/or radon.

The systems described herein effectively achieve, but are not limited to, the following:

improvement of dewaterability of water and wastewater treatment plant sludges, achievement of drier solids cakes during dewatering, achievement of the condition of Class A solids, economical reduction the amount of polymer used for chemical precipitation, economical reduction of the amount of inorganic salts used for chemical precipitation, effective destruction of bacteria and viruses and achievement of "secondary" levels of treatment of raw domestic sewage, The systems described herein effectively treat raw water or generated domestic sanitary sewage from such applications as remote oil and gas exploration camps, oil drilling rigs, military base camps and improves of drinking water and sanitary conditions in third world countries.

The systems described herein utilize electrochemical treatment with direct electrical current to an electrochemical cell consisting of specially designed parallel rods situated parallel with the direction of flow. The design of the selective electrode materials and electrode spacing includes integrating the system's operating variables into an individual design which is then applied for the removal of a specific contaminant or a combination of contaminants that are present at specific concentrations within an aqueous stream for a specific application or industry. The cells may be single or plural in parallel or series arrays.

The systems described herein take advantage of selective electrode materials which offer advantages one over the other for the removal of a specific contaminant or a combination of contaminants that may be present in an aqueous stream, or to achieve a specific byproduct chemistry based on either the further intended treatment steps or the ultimate fate of the byproducts of which are to be disposed. Selective electrode materials may include, but are not limited to, iron, aluminum, titanium, carbon fiber, stainless steel or any other effective electrode material.

The systems described herein utilize specific electrode materials and configuration selection designed to achieve specific levels of treatment based on the specific contaminant or a combination of contaminants that are present at specific concentrations within the aqueous stream and the desired degree of treatment or removal. The variables which effect selective electrode material and configuration design include contaminants or the combination of contaminants to be removed, the concentrations of those contaminants, rates of flow, the pH of the aqueous streams and fluid conductivities. A resultant design is specifically developed to include selection of electrode material, electrode design configuration, electrode type, spacing between the electrodes, power to be applied and retention time in the electrochemical treatment unit selected. The resultant combination of variables results in both a specific electrical charge density or range and a specific ionic charge density or range.

Summary of the Electrochemical Treatment Method

A first step of overall electrochemical treatment methods involves the capture and transfer of the water or wastewater to an electrochemical treatment unit. This step includes pumping surface water, groundwater or wastewater to the electrochemical treatment unit.

A second step in overall electrochemical treatment methods involves passing the water or wastewater through an electrochemical treatment unit described in this application. In this step direct electrical current is applied and the rate of flow is adjusted to achieve a desired level of treatment based on the concentration of the contaminant or contaminants to be removed. Hydraulic residence time within the electrochemical treatment unit is in a range of about 15 seconds to about 2 minutes, depending on the concentration of the contaminant or contaminants to be removed.

A third step in overall electrochemical treatment methods involves passing effluent from the treatment unit through either a clarifier or filter for removal of any oxidized and/or precipitated solid particles remaining in the water.

Summary of the Electrochemical Treatment Apparatus

Multiple pairs of small diameter rods are employed to develop a strong charge density on electrodes to achieve effective treatment. By using multiple rods with a high charge density, the electrode spacing is greater than ¼" (0.635 cm), for example up to about one inch (2.54 cm) which allows for smooth and efficient flow through the treatment unit without a propensity of clogging.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which presently preferred embodiment(s) of the invention are now illustrated by way of example. It is expressly understood, however, that the drawings are for the purpose of illustration and description only and are not intended as a definition of the limits of the invention. Embodiments of this invention are described by way of example in association with the accompanying drawings in which:

FIG. 8 is a perspective, exploded view of a second embodiment of an electrochemical treatment cell, according to the invention, shown partially in section;

FIG. 9 is a top view of the treatment cell of FIG. 8;

FIG. 10 is a side elevation of the electrochemical cell of FIG. 9, taken along lines 10-10;

DETAILED DESCRIPTION OF EMBODIMENTS OF THE INVENTION

Figure 1:
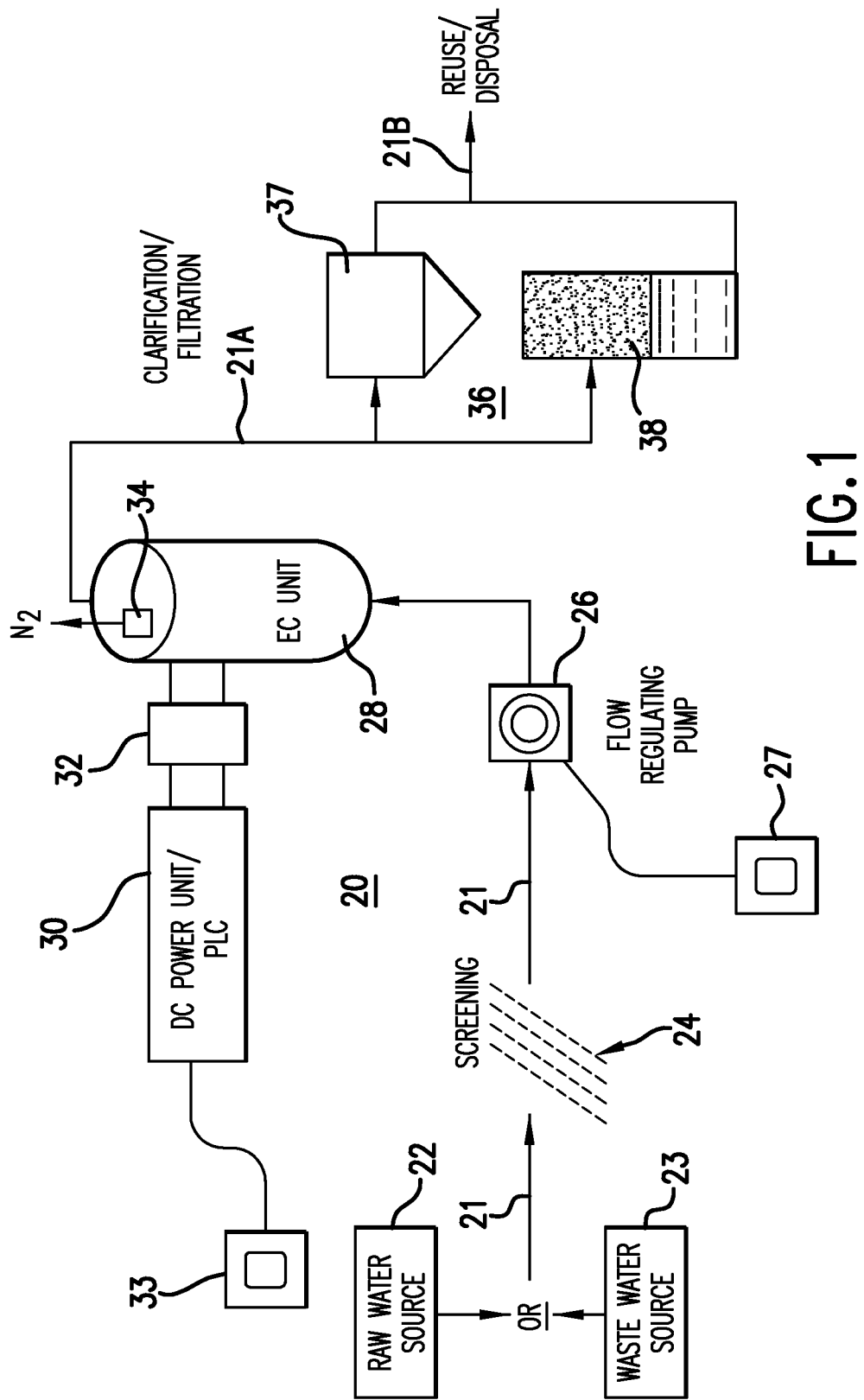
FIG. 1 is a schematic view of an electrochemical water and wastewater treatment system in accordance with the systems, apparatus and methods of the present invention.

A variety of organic and inorganic contaminants in water or wastewater are capable of undergoing direct electrochemical oxidation or reduction without the involvement of other substances or catalysts, except for the possible release of electrode material. A general understanding of this phenomenon is available from the following considerations of chemical equations and unbalanced portions of chemical equations.

Electrolysis of Water

In addition to organic and inorganic contaminants, water itself is also capable of undergoing electrochemical transformation including electrolysis and dissociation as follows:

Reaction at the Anode (Oxidation)

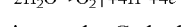

$$2H_2O \rightarrow O_2\uparrow + 4H^+ + 4e^-$$

Reaction at the Cathode (Reduction)

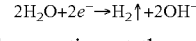

$$2H_2O + 2e^- \rightarrow H_2\uparrow + 2OH^-$$

The reaction at the cathode results in the production of both hydrogen gas and an abundance of free hydroxyl radicals. Conveniently, the hydrogen gas becomes useful for the ultimate flotation of and separation of precipitated chemical flocs, suspended and colloidal solids and fats, oils and grease from the aqueous solution. Conveniently, the free hydroxyl radicals serve as reducing agents for removal of such contaminants as heavy metals and to raise the pH of the water. This reaction is below to be helpful for:

Precipitation of Phosphorous
Precipitation of Heavy Metals
Oxidation of Nitrate and Nitrogen Compounds
Bacterial Kill
Oxidation of Iron $$Fe-2e^-\rightarrow Fe^{+2}$$

$$Fe^{+2}-e^-\rightarrow Fe^{+3}$$

Oxidation of Organic Compounds (General)

Electrochemical oxidation of organic compounds occurs within an electrochemical cell when sufficient electrical potential differences (voltage) are applied to the anode and cathode electrodes. Due to the fact that organic compounds usually contain one of more high strength ionic and covalent bonds their oxidation proceeds simultaneously with the production of $O_2$ from the electrochemical oxidation of $H_2O$. The following formula provide a generic form of oxidation of organic compounds.

$$Org-e^-\rightarrow \text{Oxidation products}$$

Oxidation of Cyanide $$CN+2OH^-=CNO^-+H_2O+2e^-$$

Oxidation of Arsenic

Arsenic in groundwater is usually in the form of arsenite ($As^{-3}$). In the electrochemical cell fitted with iron electrodes the arsenite undergoes oxidation to arsenate ($As^{-5}$). In addition the iron released from the anodes combines with the arsenate to form the insoluble precipitate ferric arsenate as follows.

$$2H_3AsO_3+2H_2O\rightarrow 2H_3AsO_4^-+H_2\uparrow$$

$$2Fe^{+2}-2e^-\rightarrow 2Fe^{+3}$$

$$2Fe^{+3}+6H_2O\rightarrow 2FeOH_3+H^2\uparrow$$

$$2FeOH_3+2H_3AsO_4^->2FeAsO_4\downarrow+6H_2O$$

Carbonates

Two major contaminants which cause water hardness are calcium bicarbonate, $Ca(HCO_3)_2$, and magnesium bicarbonate, $Mg(HCO_3)_2$. In a first electrochemical cell according to the invention, the bicarbonates are broken down by oxidation into the corresponding carbonate, water and carbon dioxide.

$$Ca(HCO_3)_2\rightarrow CaCO_3+H_2CO_3$$

The calcium carbonate is insoluble and will be captured by a filter. As the carbonates are strongly electronegative, some may plate out onto the anodes in the electrochemical cells. However, most of the carbonates do not adhere to the anodes. The carbonate acid, $H_2CO_3$, reacts with any calcium carbonate scaling in the downstream pipes re-dissolving it to soluble calcium bicarbonate. Over a period of time, scale will be removed.

$$CaCO_3(\text{as scale})+H_2CO_3(\text{dissolved }CO_2)\rightarrow Ca(HCO_3)_2$$

As a result, the water undergoes a softening process and the downstream scaling is slowly dissolved.

Nitrogen Oxides

As nitrogen oxides such as $NO_3$, $NO_2$ and NO undergo reduction in the electrochemical cells, the nitrogen oxides undergo the following reactions:

$$\text{Cathode: }2NO_3+12H^++10e^-\rightarrow N_2+6H_2O$$

$$\text{Anode: }2H_2O\rightarrow 2H^++O_2+4e^-$$

These reactions are simplified versions of a multi-step process in which the nitrogen oxides are reduced. The nitrogen oxides are converted to nitrogen gas. In cases where contamination of the treated water is severely high, the amount of gas formed may be high enough to require evacuation from the system. In such cases, the gases are trapped in the head of the filter vessel onto which an air vent connected to the outdoors may be mounted.

In a further alternative, the iron anode may be replaced with an aluminum anode. When the current is applied to the electrochemical cell, the aluminum anode releases activated alumina into the solution. The activated alumina reacts with the arsenate to form aluminum arsenate. Aluminum arsenate is insoluble and will be captured in a downstream filter.

The foregoing discussion provides a theoretical basis as for the success of the method and system described herein.

In the present invention the laws of physics, chemistry, electricity, thermodynamics and hydraulics are applied in a cost effective way to treat water and wastewater electrochemically while avoiding the problems and pitfalls of the past. The key to successful electrochemical treatment of water and wastewater at atomic and molecular levels is properly applying combinations of voltage, amperage, hydraulic retention time and electrode material to provide effective electrical charge densities on electrodes and electrical potential between the electrodes to then produce desired electrochemical reactions. The system described herein utilizes parallel or substantially parallel electrode array configurations for incorporating the individual treatment units into a horizontal or vertical manifold to achieve both redundancy and provide for greater system capacity.

FIGS. 1-7

FIG. 1 is a schematic overall view of a water or wastewater electrochemical treatment system 20 configured in accordance with the present invention. Water 21 from a raw water source 22, or from a wastewater source 23, is screened at a screening station 24 to remove large solids which could damage downstream apparatus. The raw water source 22 can be a drilled or dug well or a body of water, such as but not limited to, a river, stream, lake, reservoir or any other source of potentially potable water. If the water 21 is from a wastewater source 23, the water can be from a sewage plant, an industrial wastewater site or from any other source of accumulated or flowing wastewater.

After the screening station 24 has removed large solids from the water 21 to prevent downstream damage, the water is pulled by a flow regulating pump 26 and conveyed to an electrochemical treatment unit 28 configured in accordance with the principles of the present invention. A monitor and control module 27 attached to the flow regulating pump 26 determines the hydraulic residence time within the electrochemical treatment unit 28, and thus depending upon applied electrical parameters, helps determine electrical charge density within the electrochemical treatment unit. A DC power unit 30 controlled by a controller 33 converts AC line current to DC and applies DC to the electrochemical treatment unit 28 while a polarity reverser 32 allows the DC to be reversed periodically in order to minimize the possibility of clogging in the electrochemical unit 28. A selected contaminate or multiple contaminates are removed form the water stream 21 by the electrochemical treatment unit 28 while an uncontaminated water stream 21A flows to a clarification/filtration station 36. If a gas, such as nitrogen ($N_2$), is separated from the water stream 21 in the electrochemical treatment unit 28, the gas may vented by a vent 34.

If the treated water stream 21A still contains suspended solid particulates precipitated by the electrochemical treatment unit 28, the suspended solid particulates are removed by a clarification/filtration station 36, which comprises either a gravitational or centrifugal separation unit 37, or a filtration unit 38. In some situations it may be necessary to use both gravitational or centrifugal separation, as well as filtration in order to provide an uncontaminated water stream 21B which may be for initial use or reuse, or for disposal back into the environment.

FIGS. 2-6 illustrate an initial embodiment of an electrochemical module 40 for use as the electrochemical treatment unit 28, or for use as a stand alone electrochemical treatment unit. The module 40 is an initial prototype of an electrochemical treatment unit formed as a cell, which may be combined with other similar cells when practicing the invention. The module 40 has a horizontal orientation in FIG. 2 and has successfully demonstrated that dissolved nitrogen and dissolved phosphorous compounds are removed from a water stream 21 contaminated therewith when mechanical parameters such as electrode spacing, speed of the pump 26 and volume of the module 40 are considered in combination with electrical parameters, such as potential, amperage and rates of polarity change. Using the module 40, Applicant was able to decontaminate a water flow 21 without clogging of the module, a drawback that has prevented current commercial use of electrochemical decontamination for water treatment.

Figure 2:
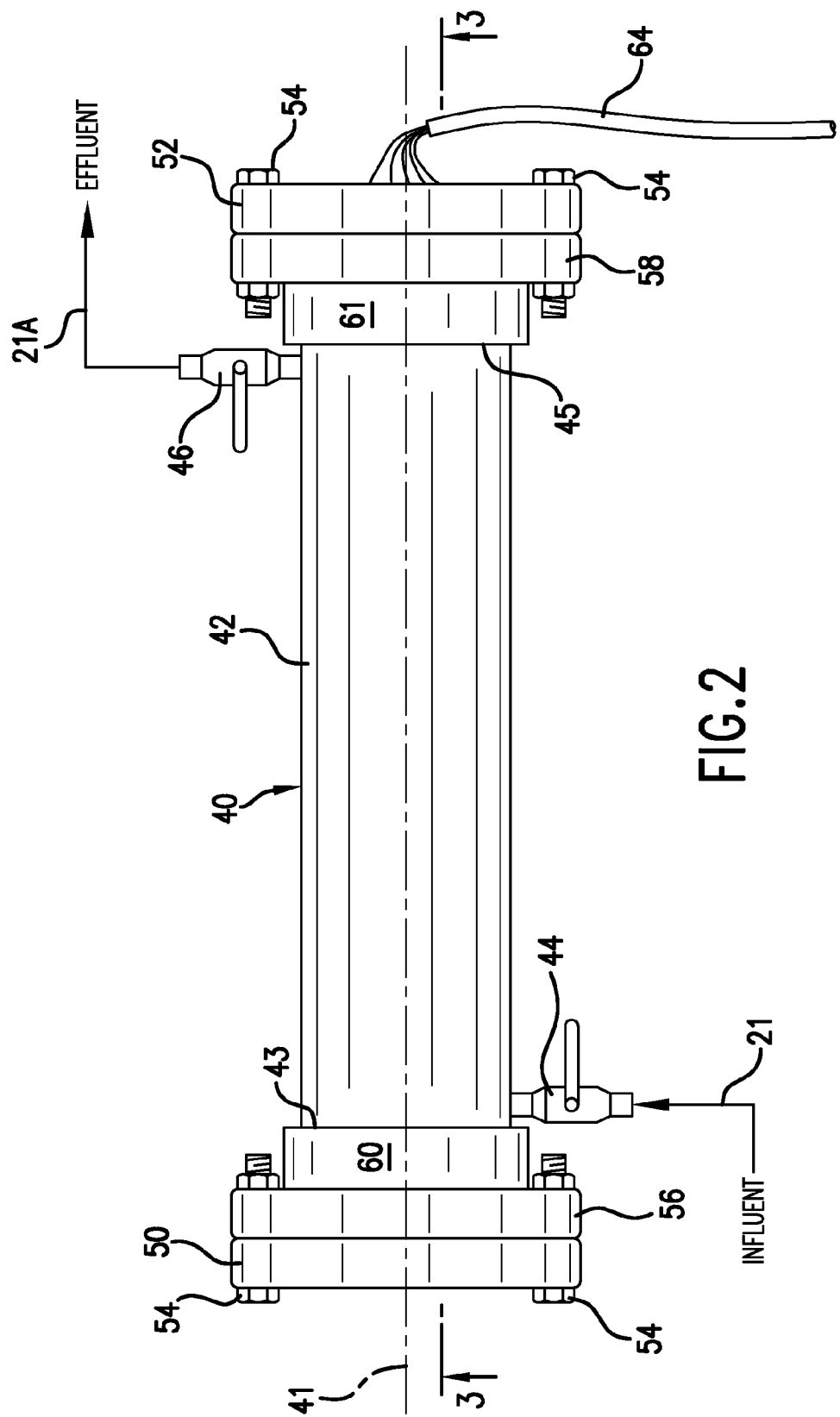
FIG. 2 is a side view of an electrochemical treatment cell according to an initial embodiment of the invention oriented horizontally.

As is seen in FIG. 2, module 40 is aligned, or substantially aligned, with a horizontal axis 41. The module 40 comprises a cylindrical chamber 42 made of a dielectric material such as polyvinylchloride (PVC) and having at a first end portion 43 an inlet 44 that receives an influent in the form of the water stream 21. At a second end portion 45, an outlet 46 releases an effluent stream in the form of the water stream 21A in which previously dissolved contaminants have been separated from the water and exist in the form of relatively small particulates that are subsequently filtered, or in the form of gas that is subsequently vented. The first and second ends 43 and 45 of the chamber 42 are closed by end caps 50 and 52, respectively, made of a dielectric material such as PVC. The end caps 50 and 52 are bolted by bolts 54 to inverting rings 56 and 58, respectfully, that are received around the first and second ends 43 to 45 of the chamber 42 and are positioned in abutment with end sleeves 60 and 61 fixed to the cylindrical chamber 42. Positively charged and negatively charged leads 64 extend from the second end cap 52 on the cylindrical chamber 42 and are attached to electrodes within the chamber.

Figure 3:
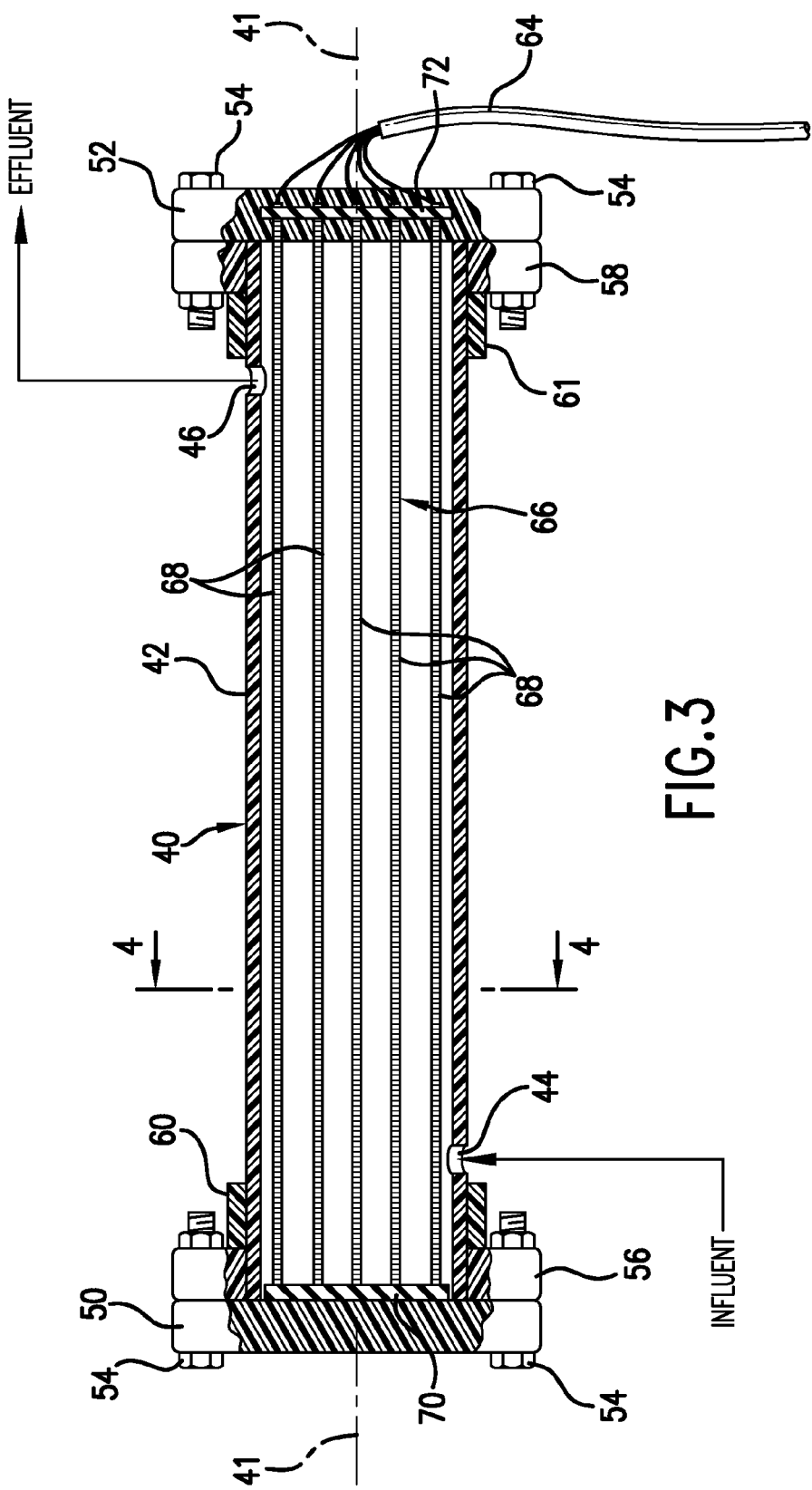
FIG. 3 is a side view partially in elevation taken along lines 3-3 of FIG. 2 showing an array of electrodes within the electrochemical treatment cell.
Figure 4:
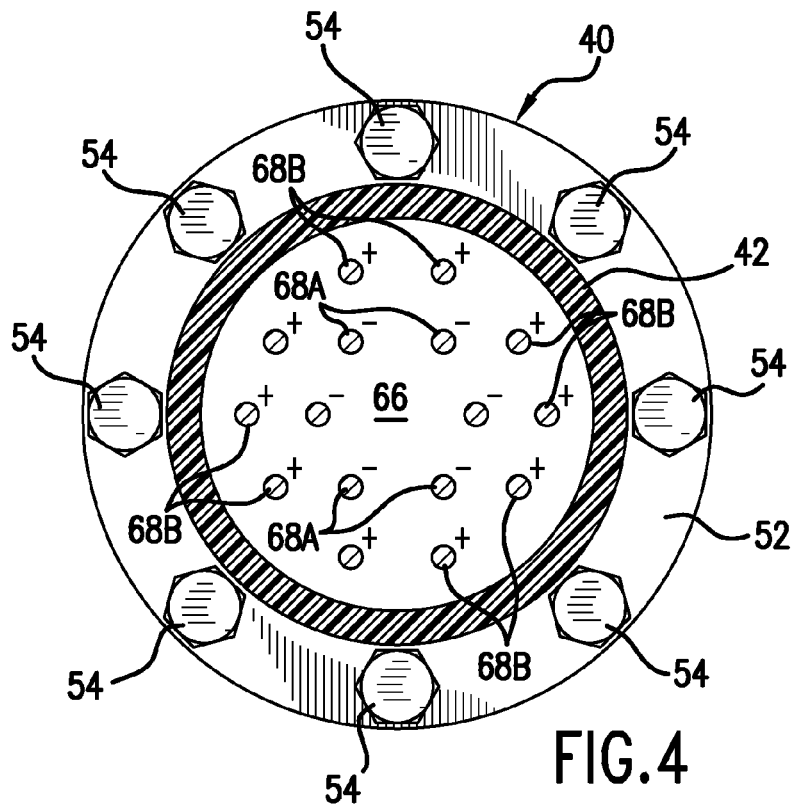
FIG. 4 is an end view, partially in elevation, taken along lines 4-4 showing of FIG. 3 a charge distribution on the array of electrodes shown in FIG. 3.
Figure 5:
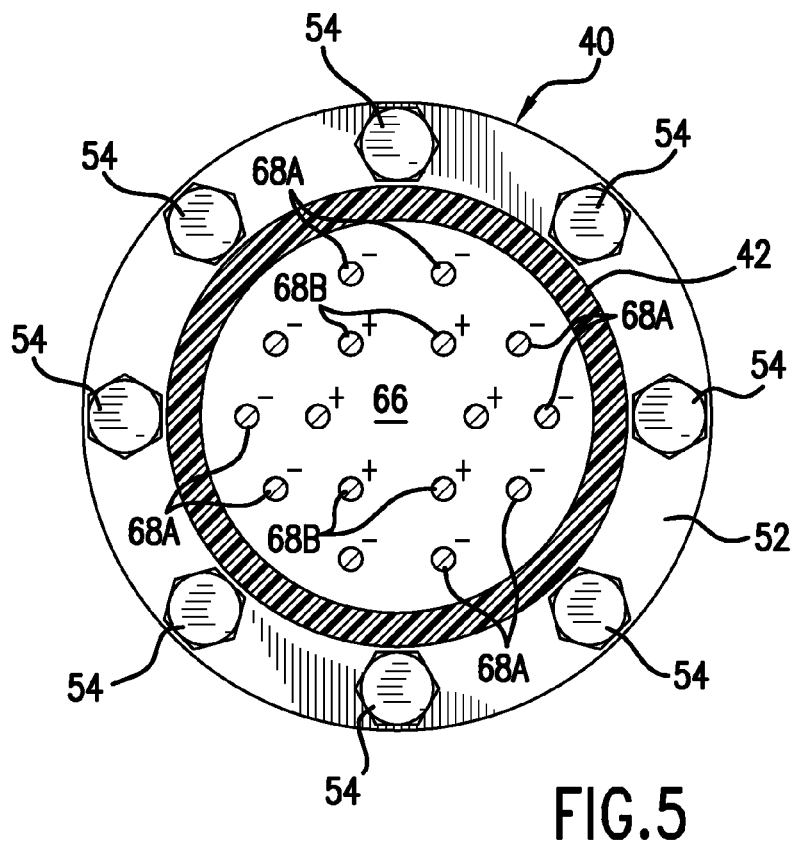
FIG. 5 is an end view similar to FIG. 4 showing a reversed charge distribution on the array of electrodes of FIGS. 3 and 4.

Referring now to FIGS. 3-5, it is seen that within the chamber 42 an array 66 of electrodes 68, configured as rods, are imbedded in a separator 70 of insulating material adjacent to the first end cap 50, and imbedded in an insulator 72 of insulating material, at the second end cap 52 so that the electrodes 68 are electrically isolated from one another. In order to ionize and remove dissolved contaminates, it is necessary to set up electrical charge gradiants within the chamber 42 by negatively charging one portion of the array 66 of electrodes 68 and positively charging another portion of the array 66 of electrodes 68.

As is seen in the end views of FIGS. 4 and 5, one array of electrodes 68A has a negative charge (−) while another array of electrodes 68B has a positive charge (+). This creates ionization within the water 21 being treated. In order to prevent clogging of electrodes 68B attracting negatively charged ions, the polarity of the arrays 66A and 66B are periodically reversed, as is shown by comparing FIGS. 4 and 5. By applying DC current at low voltage and keeping the influent water 21 moving though the chamber 42 at a selected speed so that hydraulic retention time is sufficient to obtain ionization of contaminates suspended in particulate form in the water 21 being treated, and by periodically reversing the polarity of the electrode arrays, clogging of the space between electrodes array 66A and 66B is avoided. Since the particulate contaminates remain suspended, the particulates can be removed by settlement and filtration at station 36 of FIG. 1.

Figure 6:
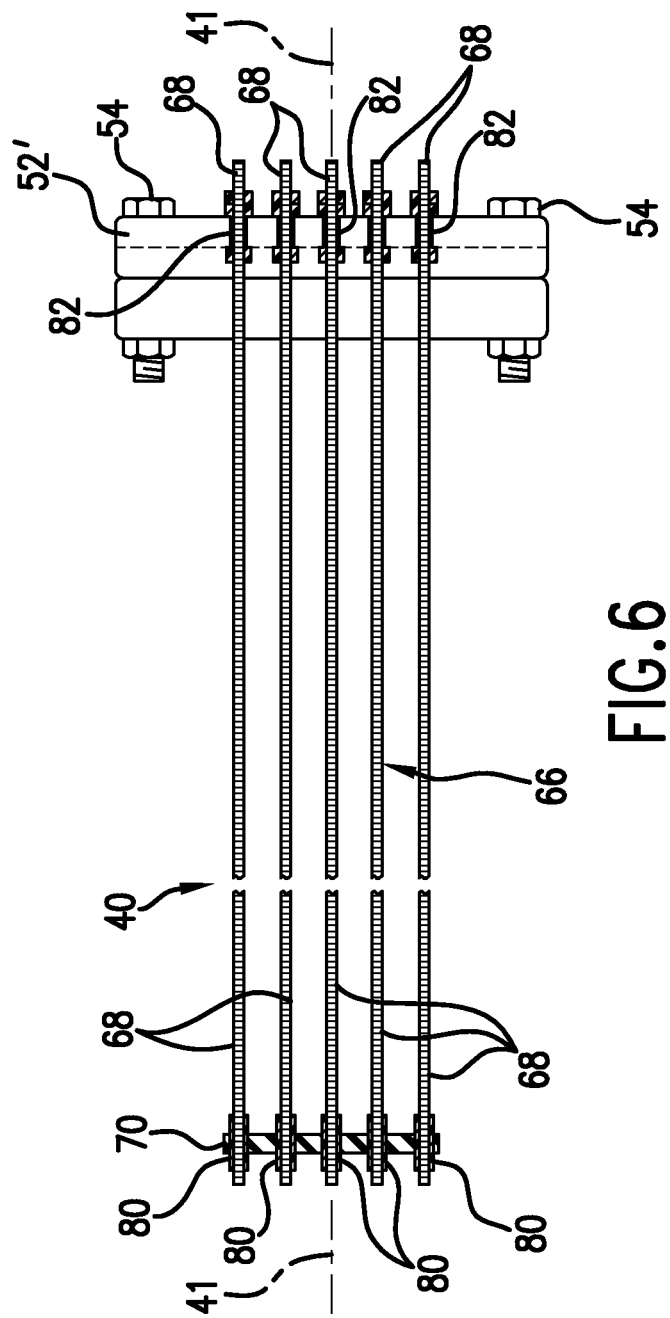
FIG. 6 is a side elevational view of the electrochemical treatment cell of FIGS. 2-5 with the housing removed showing details of an arrangement for mounting the electrodes.

Further with respect to the embodiment of FIGS. 2-6, FIG. 6 shows a practical way in which to install the electrode array 66 wherein the electrodes 68 are retained by the first insulator 70 located at end cap 50 using bushings 80 and retained by the second insulator 72 at second end cap 52' by bushings 82. In the arrangement of FIG. 6, the end caps 50 and 52' are made of an insulating material such as PVC.

Figure 7:
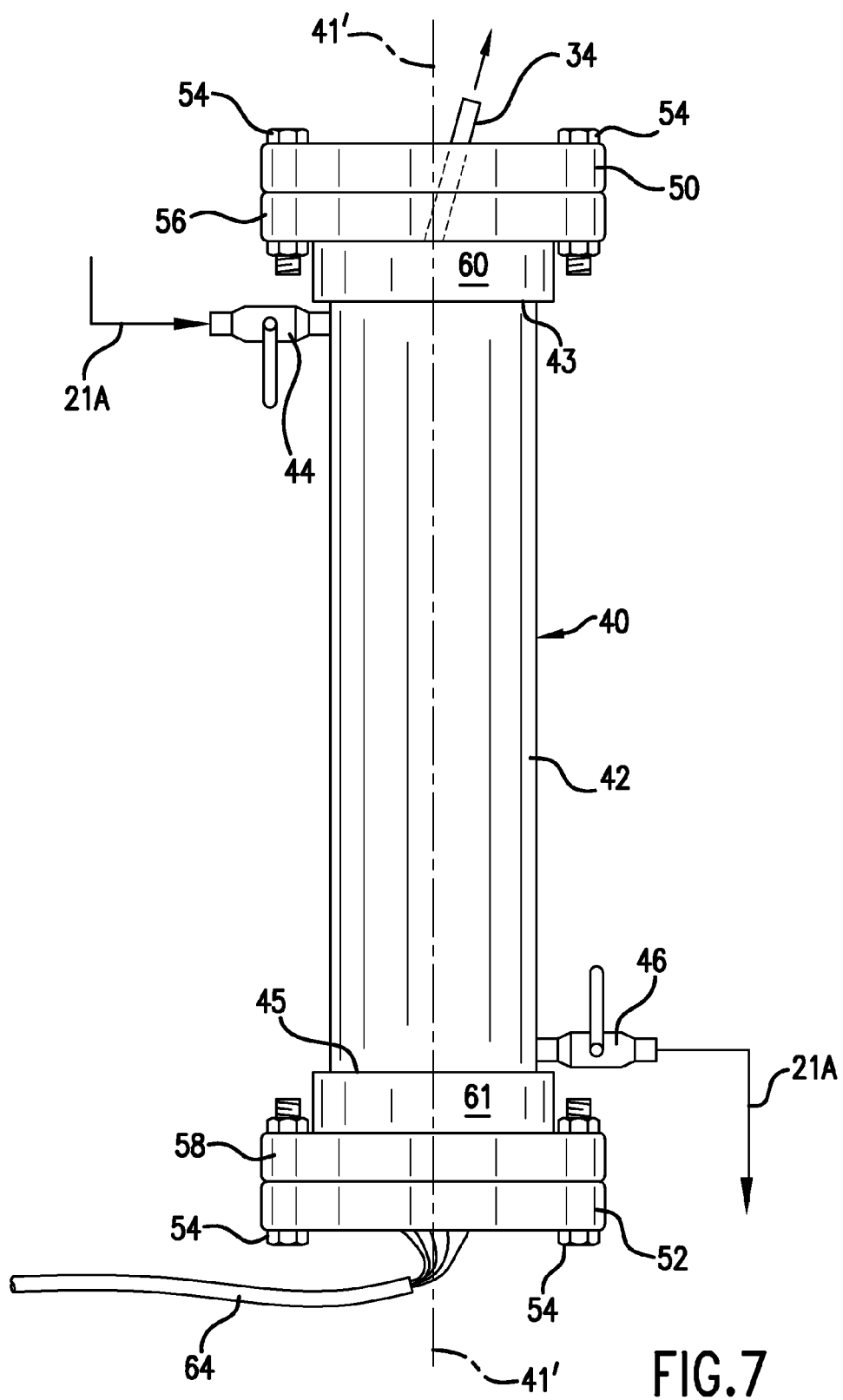
FIG. 7 is a side view of an electrochemical treatment cell similar to that of FIG. 2 but oriented vertically.

While the module 40 is shown aligned with a horizontal axis in FIG. 2, the module 40 is oriented with a vertical axis 41' in the second embodiment of the invention shown in FIG. 7. This takes advantage of the tendency of gas to flow upwardly allowing gas to vent via a vent 34 now disposed proximate the upper end 43 of the chamber 42 of the module 40.

The key to successful electrochemical treatment of waste and raw water at atomic and molecular levels is effective application of voltage, amperage, hydraulic retention time and electrode material in combination to provide electrical charge densities on the electrodes and electrical potential between the electrodes to produce a desired electrochemical reaction. The power applied is determined according to the mass of material to be removed, i.e., watts/pounds removed.

The following Charts A, B and C cite test data from testing the prototype illustrated in FIGS. 2-7 of the drawings. The parameters used occur within testing ranges initially selected by the inventor, which ranges do not limit the scope of the inventor's invention. The test data establish that the inventor has eliminated, or at least minimized, clogging of spaces between electrodes 68 by contaminants when electrochemically removing contaminants from water within the module 40.

As is evident from the charts, preferred test ranges are as follows:

DC Voltage: about 10 volts to about 50 volts,
DC Amperage: about 15 amps to about 35 amps,
Hydraulic retention time: about 2 minutes to about 5 minutes,
Spacing between electrodes: about 0.75 inch (1.90 cm), and
Polarity switching cycle: performed manually at intervals of about 5 minutes.

The ranges and specific parameter values recited in the Charts A, B and C are within larger contemplated ranges as follows:

DC Voltage: about 10.0 volts to about 60 volts,
DC Current: about 5.0 amps to about 50.0 amps,
Hydraulic Retention Time: about 30 seconds to 5 minutes, about 2 minutes, 30 seconds being preferred
Electrode Diameters: about 0.25 inch (0.635 cm) is preferred, but the electrodes may be effective at other diameters
Electrode Spacing: preferably >0.25 inch (0.635 cm)
Electrode Materials: iron, copper, carbon, aluminum.
Electrode Shape: The electrodes may have any shape effective to accomplish the invention, such as but not limited to: cylindrical rods, perforated or unperforated flat plates, undulating plates or rods.

Polarity Change Cycle: about 1 minute to 15 minutes.

While the cylindrical module 40 used to demonstrate the effectiveness of the invention has a length of 25 inches (63.5 cm) and a diameter of 6 inches (15.24 cm), a module used to practice the invention may have any dimensional configuration that achieves similar useful results. The electrodes 68 of the illustrated electrode array 66 are iron rods that are circular in cross section and have a diameter of ¼ inch (2.54 centimeters). The cylindrical module 40 has dimensions which are suitable for intermittent flow wherein the water being treated remains in the module for a time sufficient to apply various voltages and amperages to achieve a range of test results such as those of the Charts A, B and C.

A preferable practice is to have an array of modules, configured to achieve results similar to the module 40, wherein individual modules can be readily replaced if necessary. The module can be arranged with other modules in parallel or serial arrays, or unparallel and serial arrays, to accomplish removal of contaminants from waste water or raw water. In order to increase hydraulic retention time, recycling of partially decontaminated water can be performed in order to further decontaminate already treated water.

Module construction can be scaled up to a much larger individual size, for example, a size suitable to decontaminate waste water discharged from sewerage plants. Also, module construction can be scaled much smaller, for example to decontaminate tap water or water entering a home or a community, so as to remove endocrine disrupting compounds and personal care products from potable water. Modules scaled even smaller and using DC current from batteries and/or solar cells are usable to decontaminate raw water for drinking by campers, hunters and hikers, as well as to decontaminate raw water for military personnel.

The principles of the present invention, as exemplified in by the module 40 of FIGS. 2-7, can be used to treat waste water and/or bilge water prior to discharge from ships and pleasure boats to remove contaminants. It is also contemplated that these principles are applicable to removing salt from sea water when sea water is used as a source of raw water for ships or perhaps agriculture, and for removing urea from urine recirculated to provide drinking water for astronauts.

Charts A, B and C are test results establishing the effectiveness of the method and system in removing various contaminants from water and aqueous solutions.

CHART A

Electrochemical Treatment of Municipal Wastewater Plant 1

| | Contaminant | | |
|---|---|---|---|
| | Raw BOD[1] | Raw Phos | Raw TKN[2] |
| Electrode Material | Iron | Iron | Iron |
| Electrode Spacing (inches; centimeters) | 0.75; 1.905 | 0.75; 1.905 | 0.75; 1.905 |
| Power Supplied to the System DC Voltage Applied | 120 Volt AC | 120 Volt AC | 120 Volt AC |
| Low | 10 | 10 | 10 |
| Medium | 30 | 30 | 30 |
| High | 50 | 50 | 50 |
| Amperage Applied | | | |
| Low | 15 | 15 | 15 |
| Medium | 25 | 25 | 10 |
| High | 35 | 35 | 15 |
| Hydraulic Retention Time (minutes) | | | |
| Low | 1 | 1 | 1 |
| Medium | 3 | 3 | 3 |
| High | 5 | 5 | 5 |
| Untreated Concentration (mg/l) | 350 | 6.9 | 62 |
| EC Treated Concentration (mgl) | | | |
| Low | 52 | 4.4 | 44 |
| Medium | 34 | 1.3 | 39 |
| High | 26 | 0.8 | 31 |
| Percent Removal | | | |
| Low | 85 | 36 | 29 |
| Medium | 90 | 81 | 37 |
| High | 93 | 88 | 50 |

| | Contaminant | | |
|---|---|---|---|
| | Effluent Nitrate | Effluent E Coli | Primary Phos |
| Electrode Material | Iron | Iron | Iron |
| Electrode Spacing (inches; centimeters) | 0.75; 1.905 | 0.75; 1.905 | 0.75; 1.905 |
| Power Supplied the System DC Voltage Applied | 120 Volt AC | 120 Volt AC | 120 Volt AC |
| Low | 10 | 10 | 10 |
| Medium | 30 | 30 | 30 |
| High | 50 | 50 | 50 |
| Amperage Applied | | | |
| Low | 15 | 15 | 5 |
| Medium | 25 | 25 | 10 |
| High | 35 | 35 | 15 |
| Hydraulic Retention Time (minutes) | | | |
| Low | 1 | 1 | 1 |
| Medium | 3 | 3 | 3 |
| High | 5 | 5 | 5 |
| Untreated Concentration (mg/l) | 16.8 | >1,600 | 2.3 |
| EC Treated Concentration (mgl) | | | |
| Low | 0.2 | 0 | 0.8 |
| Medium | 0.2 | 0 | 0.3 |
| High | 0.2 | 0 | 0.3 |
| Percent Removal | | | |
| Low | 99 | 99+ | 65 |
| Medium | 99 | 99+ | 87 |
| High | 99 | 99+ | 87 |

[1]BOD—Biochemical Oxygen Demand
[2]TKN—Total Kjeldahl Nitrogen (sum of organic nitrogen, ammonia and ammonium)

CHART B

Electrochemical Treatment of Municipal Wastewater Plant 2

| | Contaminant | | |
|---|---|---|---|
| | Filter Eff BOD[1] | Filter Eff TOC[3] | Effluent Ph |
| Electrode Material | Iron | Iron | Iron |
| Electrode Spacing (inches; centimeters) | 0.75; 1.905 | 0.75; 1.905 | 0.75; 1.905 |
| Power Supplied to the System | 120 Volt AC | 120 Volt AC | 120 Volt AC |

CHART B-continued

Electrochemical Treatment of Municipal Wastewater Plant 2

DC Voltage Applied

| | | | |
|---|---|---|---|
| Low | 10 | 10 | 10 |
| Medium | 30 | 30 | 30 |
| High | 50 | 50 | 50 |

Amperage Applied

| | | | |
|---|---|---|---|
| Low | 15 | 15 | 15 |
| Medium | 25 | 25 | 10 |
| High | 35 | 35 | 15 |

Hydraulic Retention Time (minutes)

| | | | |
|---|---|---|---|
| Low | 1 | 1 | 1 |
| Medium | 3 | 3 | 3 |
| High | 5 | 5 | 5 |
| Untreated Concentration (mg/l) | 4 | 34 | 6.4 |

EC Treated Concentration (mgl)

| | | | |
|---|---|---|---|
| Low | <2 | 28 | 6.9 |
| Medium | <2 | 27 | 8.0 |
| High | <2 | | 8.3 |

Percent Removal

| | | | |
|---|---|---|---|
| Low | 50+ | 18 | NA |
| Medium | 50+ | 21 | NA |
| High | 50+ | | NA |

| | Contaminant | | |
|---|---|---|---|
| | Effluent Nitrate | Effluent E Coli | Primary Phos |
| Electrode Material | Iron | Iron | Iron |
| Electrode Spacing (inches, centimeters) | 0.75; 1.905 | 0.75; 1.905 | 0.75; 1.905 |
| Power Supplied to the System | 120 Volt AC | 120 Volt AC | 120 Volt AC |

DC Voltage Applied

| | | | |
|---|---|---|---|
| Low | 10 | 10 | 10 |
| Medium | 30 | 30 | 30 |
| High | 50 | 50 | 50 |

Amperage Applied

| | | | |
|---|---|---|---|
| Low | 20 | 15 | 5 |
| Medium | 30 | 25 | 10 |
| High | 40 | 35 | 15 |

Hydraulic Retention Time (minutes)

| | | | |
|---|---|---|---|
| Low | 1 | 1 | 1 |
| Medium | 3 | 3 | 3 |
| High | 5 | 5 | 5 |
| Untreated Concentration (mg/l) | 16.7 | >1,600 | 3.5 |

EC Treated Concentration (mgl)

| | | | |
|---|---|---|---|
| Low | 10.1 | 0 | 0.6 |
| Medium | 0.1 | 0 | 0.3 |
| High | 0.3 | 0 | 0.2 |

Percent Removal

| | | | |
|---|---|---|---|
| Low | 40 | 99+ | 83 |
| Medium | 99 | 99+ | 91 |
| High | 98 | 99+ | 94 |

[1]BOD—Biochemical Oxygen Demand
[3]TOC—Total Organic Carbon (includes, but is not limited to, pharmaceutical products, such as antibiotics and endocrine disrupting compounds exemplified estrogen compounds, and to personal and household care products, such as cosmetics and deodorant sprays).

CHART C

Electrochemical Treatment of Beverage Plant Wastewater

| Contaminant | Phosphorous | Copper | pH |
|---|---|---|---|
| Electrode Material | Iron | Iron | Iron |
| Electrode Spacing (inches, centimeters) | 0.75; 1.905 | 0.75; 1.905 | 0.75; 1.905 |
| Power Supplied to the System | 240 Volt AC | 240 Volt AC | 240 Volt AC |

DC Voltage Applied

| | | | |
|---|---|---|---|
| Low | 10 | 10 | 10 |
| Medium | 30 | 30 | 30 |
| High | 50 | 50 | 50 |

Amperage Applied

| | | | |
|---|---|---|---|
| Low | 5 | 10 | 10 |
| Medium | 20 | 20 | 20 |
| High | 35 | 30 | 30 |

Hydraulic Retention Time (minutes)

| | | | |
|---|---|---|---|
| Low | 1 | 1 | 2 |
| Medium | 3 | 3 | |
| High | 5 | 5 | 5 |
| Untreated Concentration (mg/l) | 3.50 | 0.075 | 6.3 |

EC Treated Concentration (mgl)

| | | | |
|---|---|---|---|
| Low | 1.64 | ND | 7.0 |
| Medium | 1.04 | ND | 8.3 |
| High | 0.62 | ND | 8.9 |

Percent Removal

| | | | |
|---|---|---|---|
| Low | 53 | 99+ | NA |
| Medium | 70 | 99+ | NA |
| High | 82 | 99+ | NA |

The electrodes 66 used to develop the data of charts A, B, and C are circular iron electrodes having a diameter of ¼ inch (0.635 cm). For purposes of this invention the electrodes have a preferable range of ⅛ inch (0.317 cm) to 5/16 inch (0.794 cm), however, the diameter may be substantially smaller wherein the electrodes have diameters which are measured in terms of wire gauge.

FIGS. 8-12

Referring now to FIGS. 8-12 there is shown another embodiment of an electrochemical cell, but configured as a polygonal, preferably rectangular, conductive module 100 having an increased water treatment capacity over that of FIGS. 2-7. The conductive module 100 is within a dielectric housing 102, which is preferably square in cross section and made of a dielectric material such as fiberglass. Influent, such as but not limited to, untreated water 21 from a raw water source 22 or a waste water source 23 (see FIG. 1) is introduced by an inlet 103 provided at the bottom end 104 of the dielectric housing 102 of the conductive module 100. Treated exfluent 21A exits the conductive module 100 through an outlet 105 provided by the open top end of the dielectric housing 102.

Figures 11, 12:
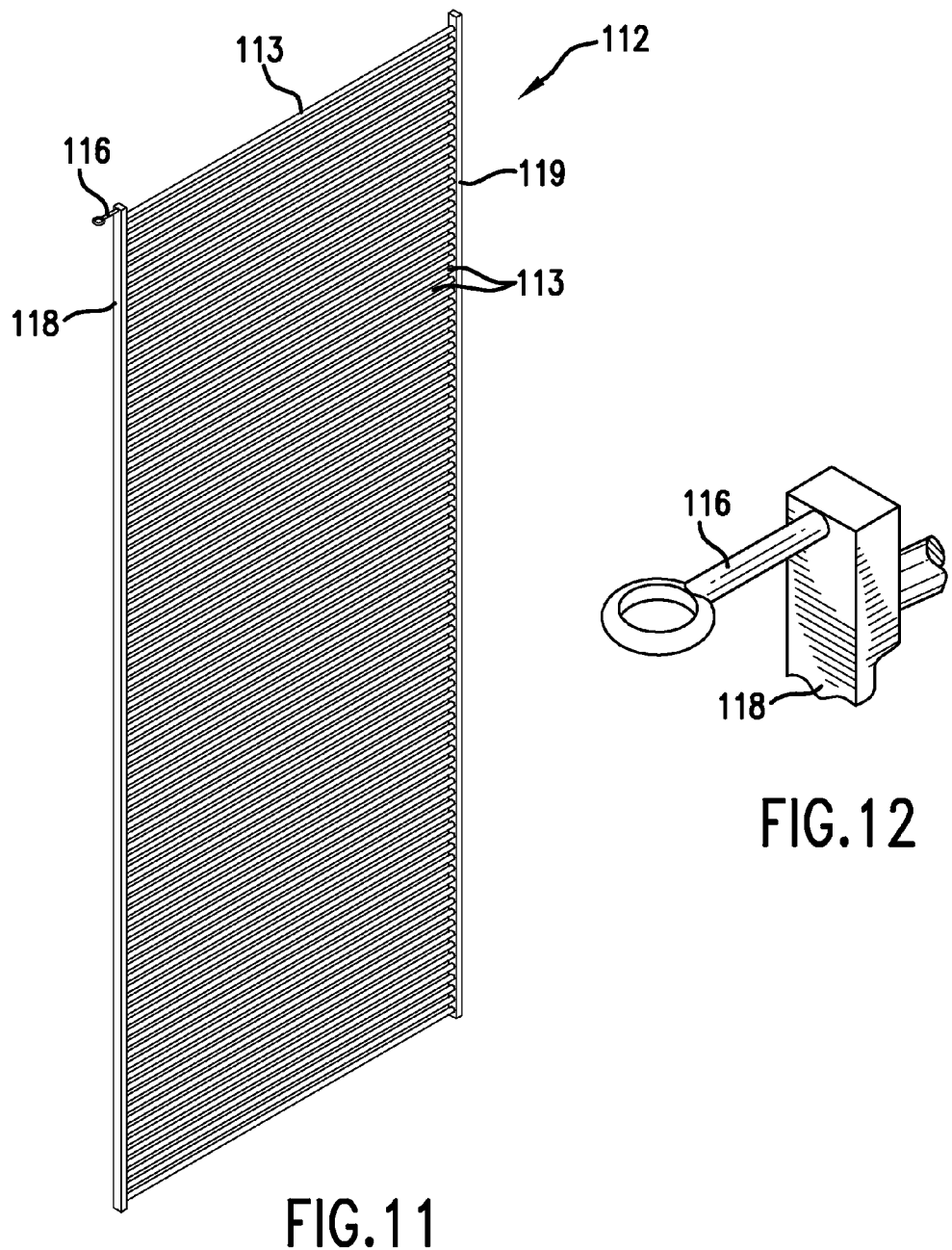
FIG. 11 is a perspective view of an electrorode rod sheet used with the electrochemical treatment cell of FIGS. 8-10.
FIG. 12 is an enlarged view of a connector used with the electro rod sheet of FIG. 11.

The untreated water 21 flows upwardly through a bank 110 of individual electrode rod sheets 112 having individual rods 113 which are preferably circular in cross section. (See FIG. 11). The electrode rod sheets 112 are connected to eyelets 116 along one bus bar 118 of each electrode rod sheet 112. The bus bars 118 establish an electrical connection with buses 120 and 122, buses having threaded posts 124 and 126 thereon. The electrode rod sheet 112 has buses 118 and 119 which provide either a positive (+) or a negative (−) polarity to the rods 113 that extend therebetween. The rods 113 are preferably circular and have a spacing of about ¾ inch (1.905 cm). The buses 120 and 122 have opposite electrical charges (+ and −) thereon so that all electrode rod sheets 112 connected to the bus bar 120 have a positive charge and all electrode rod sheets 112 connected to the bus bar 122 have a negative bias. Periodically, the polarity reverser 32 (see FIG. 1) reverses polarity on the buses 120 and 122 in order to minimize the possibility of clogging within the electrode rod sheet bank 110. Within the dielectric housing 102, the electrode rod sheets 112 are electrically insulated from one another by dielectric spacers 130 (see FIGS. 8 and 9) while adjacent electrode rod sheets 112 have electrical connections 124 and 126 of different polarities so that adjacent electrode rod sheets have opposite polarities. If over time, the individual rods 113 comprising the rod sheets 112 degrade, the electrode rod sheets or panels 112 as seen in FIGS. 11 and 12 may be readily withdrawn from the dielectric housing 102 and replaced.

The conductive module 100 of FIGS. 8-12 has a preferred processing rate in a range of about 35-60+ gallons per minute and has a width in a range of about 2 to 5 feet. In practicing this invention to remove remaining contaminants from untreated discharge water 21, numerous electrochemical modules, such as the conductive module 100, are connected in parallel. For example, at a rate of about 50 gallons per minute one hundred electrochemical conductive modules 100 are expected to decontaminate about seven million gallons of water per day.

Figure 11A:
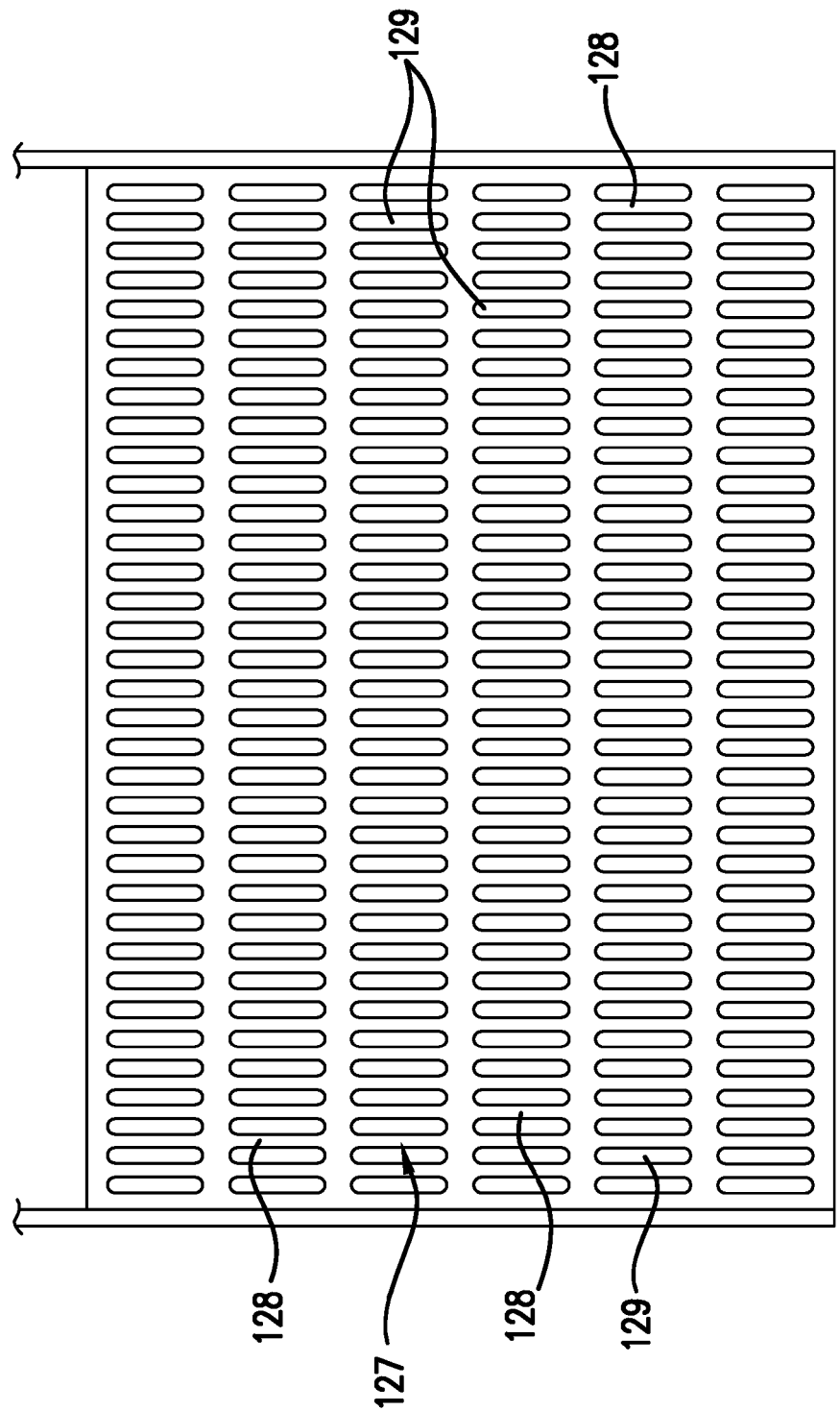
FIG. 11A is a front view of another embodiment of the electrode sheet of FIG. 11.

FIG. 11A is a perspective view of another embodiment of the invention wherein the electrode rod sheets 112 are configured as grates 127. Each grate 127 has rod portions 128 separated by elongated voids 129. The grates 127 may be formed by stamping metal plates, such as aluminum or aluminum alloy plates, to remove metal so as to create the voids 129. In the illustrated embodiment, the plate 127 is at least substantially flat. In another embodiment, the grates 127 are made of iron or iron alloys such as steel.

FIGS. 13-16

Figure 13:
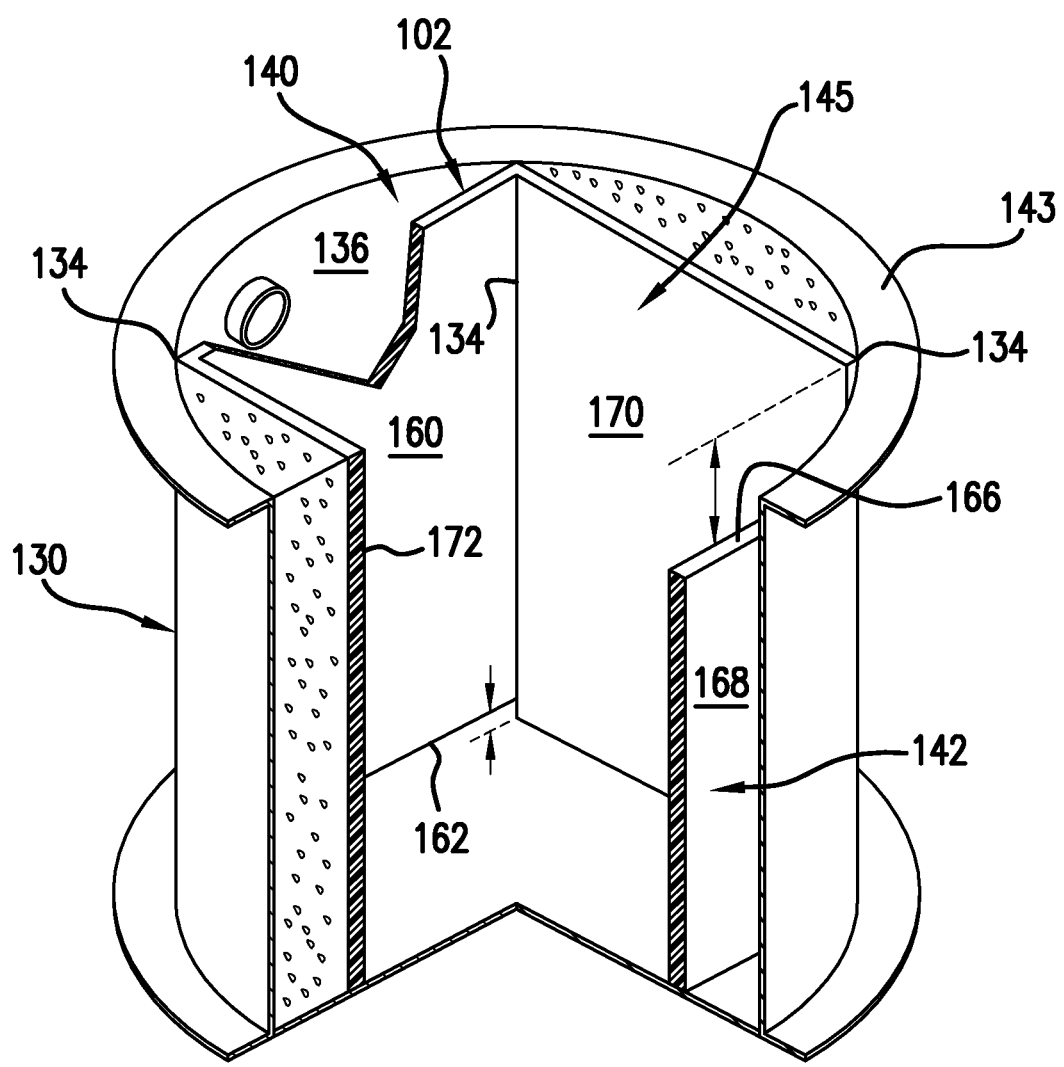
FIG. 13 is a perspective view, partially in section, of a reaction chamber formed of the electrochemical cell of FIGS. 8-12 inserted into a container.
Figure 14:
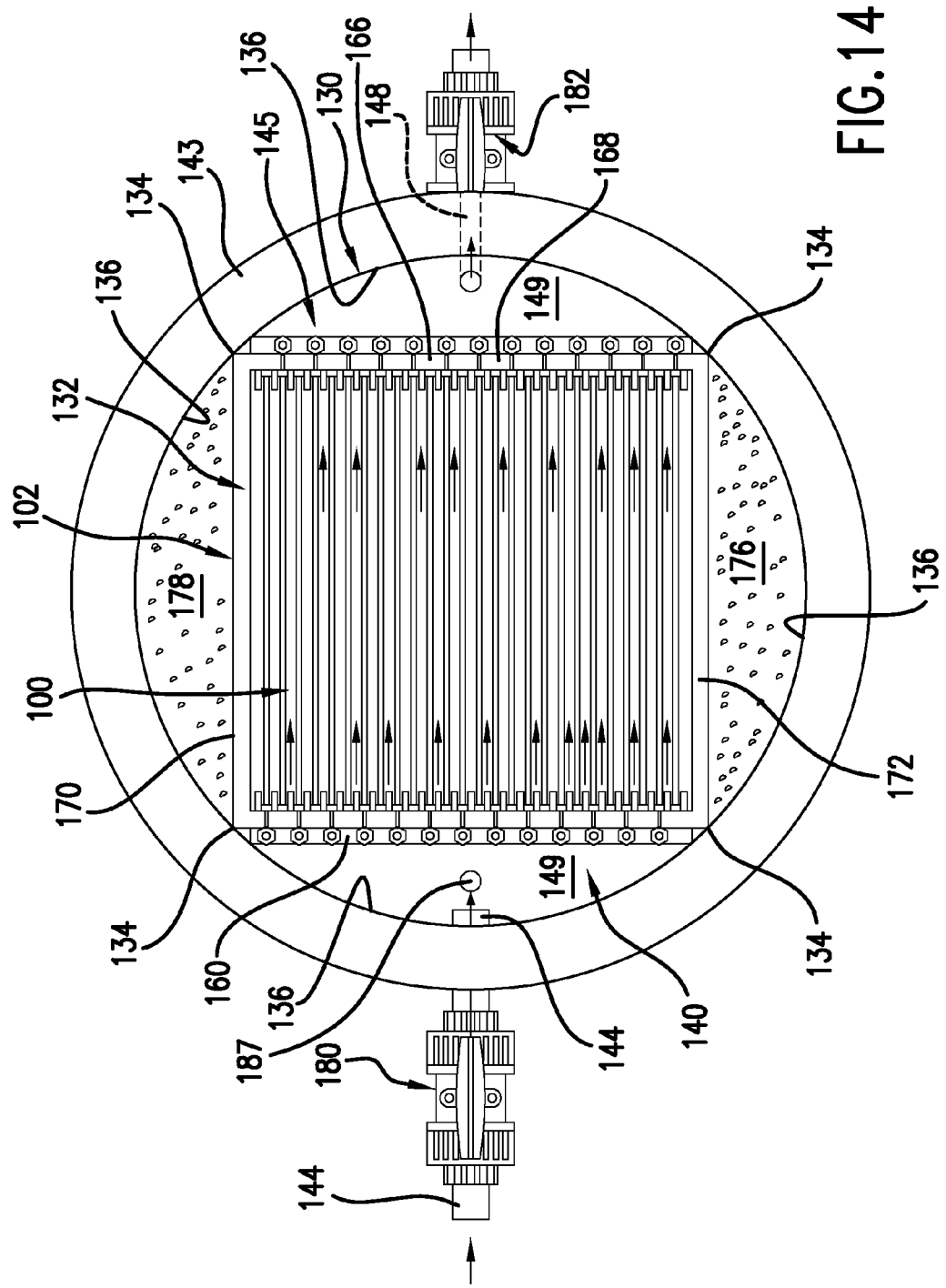
FIG. 14 is a top view of the reaction chamber of FIG. 13.
Figure 15:
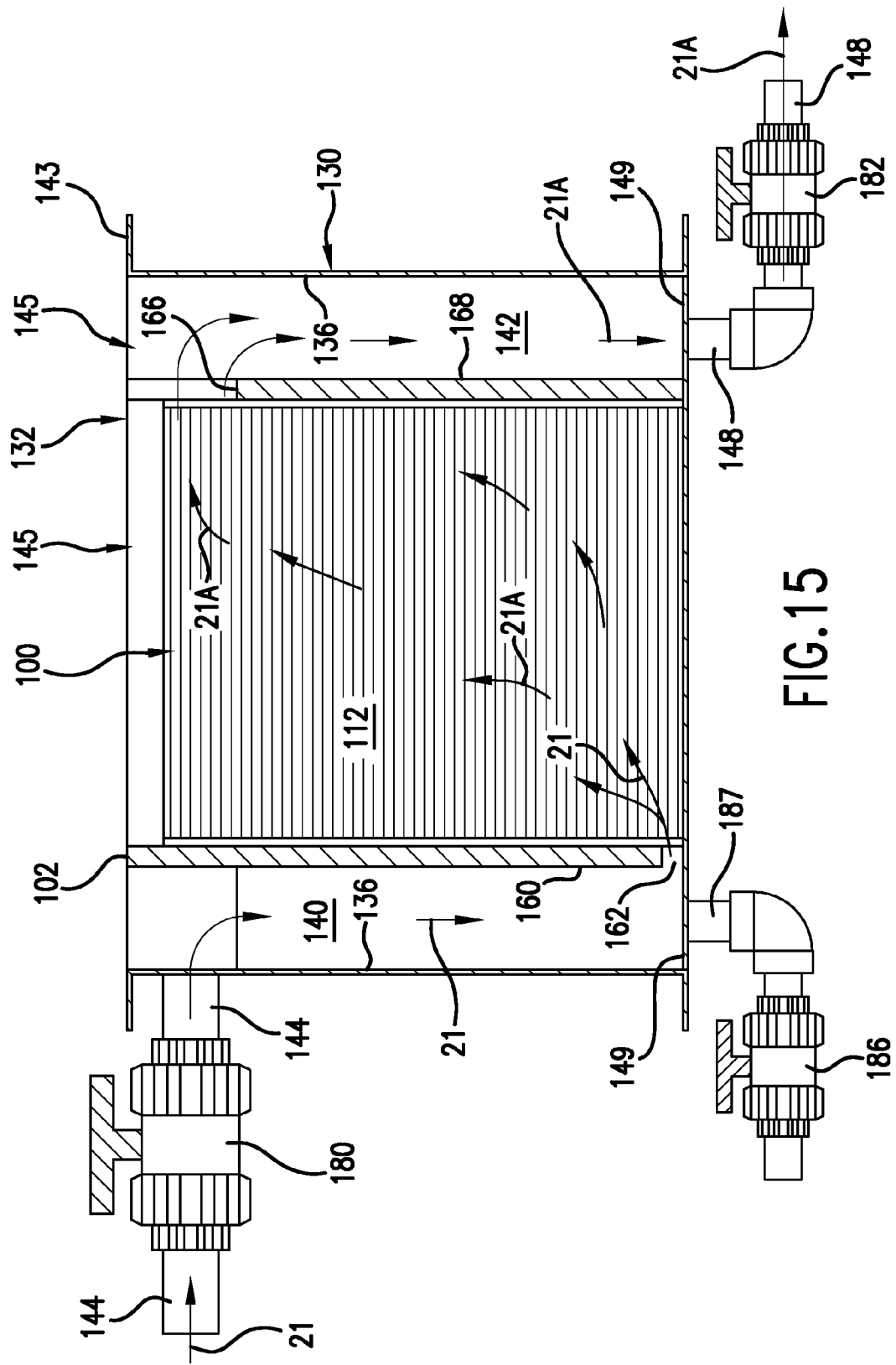
FIG. 15 is a side elevation of the reaction chamber taken along lines 15-15 of FIG. 14.

Referring now to FIGS. 13, 14 and 15, the conductive module 100 and dielectric housing 102 are inserted into a dielectric container structure 130, which in a preferred embodiment is cylindrical, to form with the dielectric container structure 130 a reaction chamber 132. The dielectric housing 102 of the conductive module 100 has vertically extending corners 134 which engage an inner cylindrical wall 136 of the container structure 130 so as to provide an inlet chamber 140 and an outlet chamber 142. The inlet chamber 140 is connected to an inlet pipe 144 for delivering untreated water 21 to the inlet chamber of the reaction chamber 132 and the outlet chamber 142 is connected to an outlet pipe 148 connected to an outlet line for discharging treated water 21A from the reaction chamber 132. A floor 149 is integral with the bottom of the cylindrical wall 136 of the dielectric container 130. In the illustrated embodiment the conductive module 100 is square in cross section and has four vertically extending corners.

In order to facilitate entry of untreated structure water 21 into the conductive module 100 the dielectric housing 102 directly support the conductive module 100 has a first wall 160 having a undercut 162 defining an inlet opening 163 allowing untreated water 21 to flow from the inlet chamber 140 into the dielectric housing 102. Hydraulic pressure in the inlet chamber 140 forces the untreated water 21 to rise in the dielectric housing 102 so that the untreated water 21 is exposed to the electrode rod panels 112 for a time sufficient to remove contaminants from the untreated water 21 to produce the treated water 21A. In one example of the illustrated embodiment, the undercut 162 has a height of about 1 inch providing a 1 inch inlet opening in the dielectric housing 102 communicating with the inlet 104 of the conductive module 100.

The treated water 21A then flows over a top edge 166 of a second wall 168 of the housing 102, which top edge 166 is an overcut which is lower than the top edges of the first wall 160 and two side walls 170 and 172 of the dielectric housing 102. From the top edge 166, the treated water 21A flows downward in the outlet chamber 142, and out of the outlet pipe 148 to the clarification/filtration station 36 (FIG. 1). The overcut reducing the height of the top edge 166 is substantially greater than the undercut 162. For example, the overcut over the top edge 166 is about 6 inches while the undercut 162 through the first wall 160 is about 1 inch.

As is seen in FIGS. 13 and 15, there are pair of side chambers 176 and 178 which are preferably filled with foam. In this illustrated embodiment, the dielectric container structure 130 is preferably made of fiberglass and the dielectric housing 102 within the container structure 130 is preferably made of Polyvinyl Chloride (PVC) forming a dielectric support structure for the conductive module 100.

As is seen in FIG. 15, there is an air gap 170 between the outlet end 171 of the inlet pipe 144 and the top surface 173 of the untreated water 21 accumulated in the inlet chamber 140. The air gap 170 electrically isolates the untreated water 21 from the upstream portion of the treatment system 20 illustrated in FIG. 1. Similarly, there is an air gap 175 between the outlet of the dielectric housing 102 formed by the over cut 166 and the top surface 177 of the treated water 21A accumulating in the outlet chamber 142. There are vents 178 and 178a through the first wall 160 and dielectric container 130 adjacent the inlet pipe 144 and a vent 179 at the top of the outlet chamber 142.

As is seen in FIGS. 14 and 15, the inlet pipe 144 includes a PVC ball valve 180 and the outlet pipe 148 includes a PVC ball valve 182. The inlet pipe 144 has a diameter (for example 3 inches) which is larger than that of the outlet pipe 148 (for example 2 inches). A PVC drain valve 186 is placed in a portion of the floor 149 at the bottom of inlet chamber 140. Preferably, the outlet pipe 148 is beneath the portion of the floor 149 located at the outlet chamber 142. The top of the housing 102 is preferably open to the atmosphere in order to let gases such as nitrogen vent from the water 21 being treated by the electrode rod sheets or panels 112.

In order to process about 40 gallons/min of contaminated water, the reaction chamber 132 has a dielectric housing 102 with a width of about 24 inches and a height of about 30 inches, which reaction chamber 132 is contained within a dielectric container structure 130 having a diameter of about 36 inches. In a preferred embodiment, only a single input pump 26 (see FIG. 1) is connected to the inlet pipe 180; however as is seen in FIG. 15, a pump 178 may be placed on the outlet pipe 148 that provides an outlet line for drainage of the treated water 21A from the outlet chamber 142.

The inlet and outlet valves 180 and 182 are adjusted so that the level of the treated water 21A emerging from the module 100 and flowing over the overcut edge 166 does not rise above the top of the container structure 130 and overflow the container structures.

A cap 185 covers the reaction chamber 132 and has a dog house vent 186.

Figure 16:
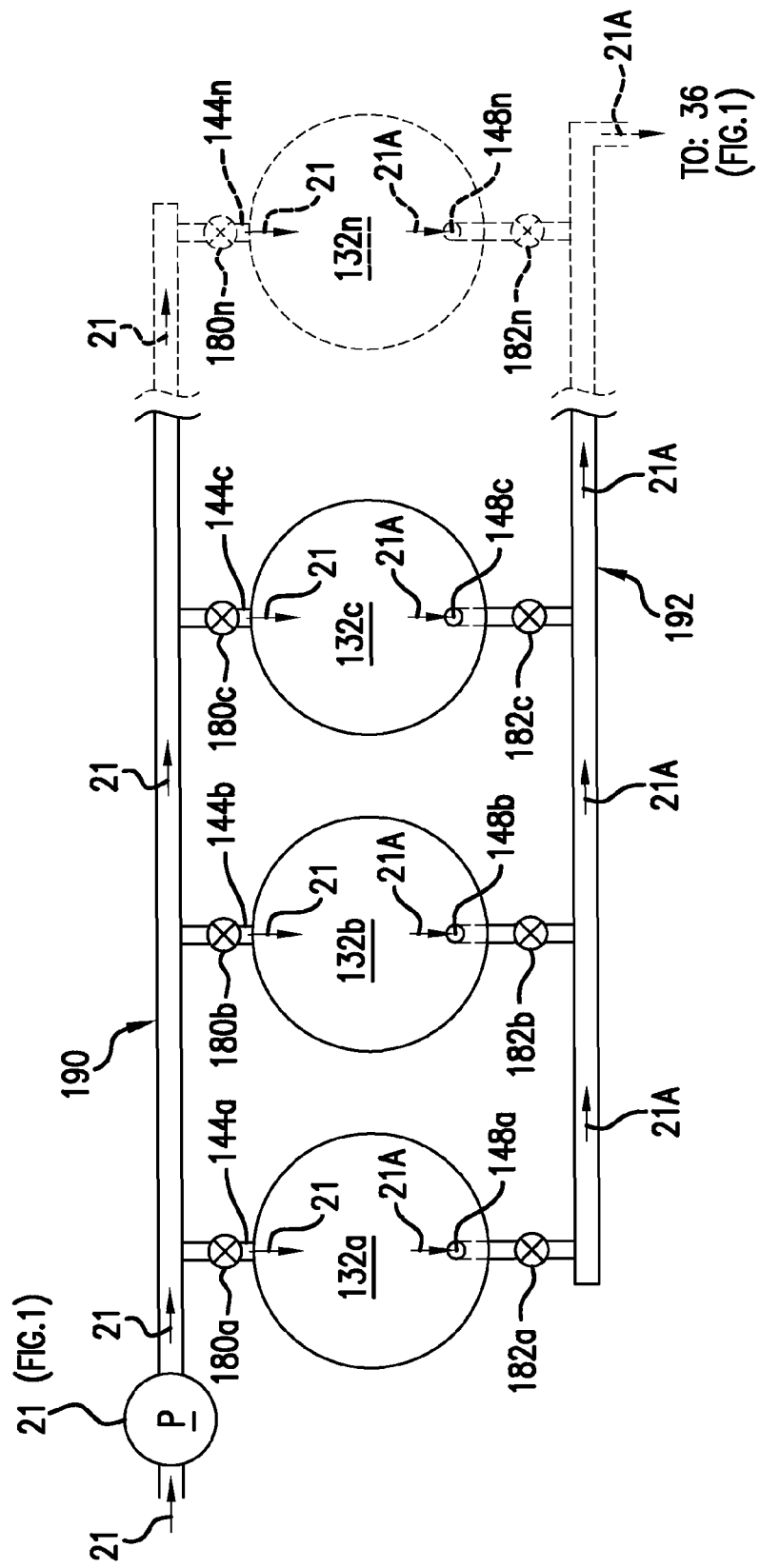
FIG. 16 is a schematic view of a plurality of reaction chamber cells arranged in parallel to treat a source of untreated water.

Referring now to FIG. 16, a plurality of reaction chambers 132 (a-n), each of which is as illustrated in FIGS. 13-15, are arranged in parallel (a-n) connection with a feed pipe 190 feeding a parallel array of inlet pipes 144. The inlet pump 26 (also see FIG. 1), pumps untreated water to each of the reaction chambers which drain through outlet pipes 148 (a-n) to a drain line 192. The drain line 192 connects to a final processing station 36 (FIG. 1) where additional clarification and/or filtration occurs before clear treated water 21B (FIG. 1) is released back into the environment or collected in holding ponds or containers for recycling.

EXAMPLES a) When using the module 100 within the dielectric container structure 130 of FIGS. 13-16, a maximum power level of about 15 Kw per module is sufficient for various applications. The actual power level applied depends on the chemical make-up of the water being treated. Preferably, the 15 Kw power supply is capable of producing direct current at 500 amps and 30 volts, or any other combination of amperage or voltage within the 15 Kw envelope.

b) In a specific example, laundry water was treated at a DC power level of 400 amps and 9 volts with satisfactory results, however a higher amperage is thought to achieve better results. The satisfactory results were achieved at a pump speed of 16.5 U.S. gallons per minute (62.46 liters per minute) with a hydraulic retention time of about 2 minutes. Specifically, removal of contaminants was observed at 95 watts/gallon [9 volts×400 amps/38 gallons (94.74 liters)].

c) Experiments on synthetic soapy samples using the module of FIGS. 2-7 used voltages in the range of 10 v to 20 v with amperages remaining under 40 amps arrange for this purpose and utilizes a maximum voltage of 50 volts and maximum amperage of about 47 amps.

d) For acidic mine drainage it was calculated that about 1 Kw per gallon (3.785 liters) is suitable.

These examples are indicative of results achieved by this invention thus far. The selected ratio of voltage/amperage depends on the contaminant being removed from the water.

Other variations of the above principles will be apparent to those who are knowledgeable in the field of the invention, and such variations are considered to be within the scope of the present invention. Other modifications and/or alterations may be used in the configuration and/or manufacture of the apparatus of the present invention, or in methods of practicing the present invention, without departing from the spirit and scope of the accompanying claims.

Moreover, the word "substantially" when used with an adjective or adverb is intended to enhance the scope of a particular characteristic.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of pending U.S. application Ser. No. 12/492,367, filed Jun. 26, 2009, are incorporated in their entirety by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A system for removing contaminants from raw water or waste water, the system including at least one electrochemical treatment module comprising:
   a housing having an inlet for untreated water and an outlet for treated water that has been treated within the housing;
   an array of electrodes comprising at least two positive and two negative electrodes within the housing, the electrodes having space there between of a selected distance, the space being greater than 0.5 inches (1.27 cm); and
   a source for applying direct current the electrodes to charge one portion of the array positively and another portion of the array negatively so as to create an electromotive force potential between oppositely charged electrodes, the direct current being sufficient to oxidize the contaminants and to neutralize small particle surface charges in an aqueous solution,
   wherein the inlet for untreated water is below the outlet for treated water and wherein the electrodes extend transverse to the direction of water flow with the array of electrodes being configured of adjacent grids of alternating polarity, the grids having insulating material disposed there between,
   each grid is formed as a panel of spaced rods disposed between a pair of bus bars with each bus bar being connected to either a positive or negative bus,
   the panels extend vertically within the housing to form an electrochemical module, and
   the housing and panels of spaced rods are both rectangular with the outlet being disposed in a detachable portion of the housing to facilitate access to the grids, the positive bus and negative bus being on opposite sides of the housing to allow replacement of the grids in the housing after removal of the outlet portion of the housing.

2. The system of claim 1 further including a switch for reversing polarity at selected time intervals to minimize clogging tendencies in the space between electrodes.

3. The system of claim 2 further including a partial removal facility having an inlet connected to the outlet for gravitational or centrifugal removal and/or filtering of contaminant particulates from the treated water to remove the contaminant particulates and a venting arrangement for venting gas contaminant from the treated water, the partial removal facility having an outlet.

4. The system of claim 2 wherein the electrodes are circular in cross section.

5. The system of claim 4 wherein the electrodes have a diameter in the range of ⅛ inch (0.317 cm) to 5/16 inch (0.794 cm).

6. The system of claim 1 wherein there are a plurality of modules arranged in parallel to form at least one group of modules to increase the capacity of the system.

7. The system of claim 6 wherein there are a plurality of groups of modules to further increase the capacity of the system.

8. The system of claim 1 wherein each positively charged electrode is adjacent at least one negatively charged electrode and wherein each negatively charged electrode is adjacent at least one positively charged electrode.

9. The system of claim 1 wherein the array of electrodes is rectangular.

10. The system of claim 1 wherein the array of electrodes is polygonal.

11. The system of claim 1 wherein the electrochemical module is square in horizontal cross section and rectangular in vertical cross section with the inlet and outlet being aligned with a vertical axis.

12. The system of claim 11 wherein the electrochemical module is combined with other electrochemical modules to remove contaminants from water.

13. The system of claim 1 wherein the electrodes have a uniform shape in cross section.

14. The system of claim 1 wherein the electrodes have a shape selected from a group consisting of cylindrical rods, perforated flat plates, unperforated flat plates, and undulating plates and rods.

15. The system of claim 1 wherein the electrodes are positioned parallel to the raw water or waste water flow and wherein the raw water or waste water directly contacts the electrodes.

16. The system of claim 1 wherein the raw water or wastewater enters a manifold and the intake of the housing positioned at the base of said housing, said raw water or wastewater flows vertically in an upward direction within a portion of the housing containing the electrodes and wherein treated water exits through outlets positioned at the top of the housing.

17. The system of claim 1 wherein said housing also comprises a vent for the release of fluid gases released during the reaction process.

18. A device for removing contaminants from raw water or waste water, the device being an electrochemical treatment module comprising:
a housing having an inlet for untreated water and an outlet for treated water that has been treated within the housing, the inlet being positioned below the outlet wherein the direction of water flow is upward toward the inlet during treatment;
an array of electrodes comprising at least two positive and two negative electrodes within the housing, the electrodes having space therebetween of a selected distance, the space being greater than 0.5 inches (1.27 cm), the electrodes extending transverse to the direction of water flow and being arranged in adjacent grids of alternating polarity with insulating material disposed therebetween; and
a source for applying direct current to the electrodes to charge one portion of the array positively and another portion of the array negatively so as to create an electromotive force potential between oppositely charged electrodes, the direct current being sufficient to oxidize the contaminants and to neutralize small particle surface charges in an aqueous solution,
wherein the grids are formed as a panel of spaced rods with each panel being disposed between a pair of bus bars and with each bus bar being connected to either a positive or negative bus,
the panels extend vertically within the housing to form an electrochemical module, and
the housing and panels are both rectangular with at least the outlet being disposed in a detachable portion of the housing to facilitate access to the panels, the positive bus and negative bus being on opposite sides of the housing to allow replacement of the panels in the housing after removal of the outlet portion of the housing.

19. The device of claim 18 wherein the electrochemical module is square in horizontal cross section and rectangular in vertical cross section with the inlet and outlet being aligned with a vertical axis.

20. The device of claim 19 wherein the electrochemical module is combined with other electrochemical modules to provide a system for removing contaminants from water.

21. The device of claim 18 wherein the electrodes have a diameter of ¼ inch (0.635 cm).

22. The device of claim 18 wherein the electrodes have a uniform shape in cross section.

23. The device of claim 18 wherein the electrodes have a shape selected from a group consisting of cylindrical rods, perforated flat plates, unperforated flat plates, and undulating plates and rods.

* * * * *